United States Patent [19]

Akins

[11] Patent Number: 5,601,885
[45] Date of Patent: Feb. 11, 1997

[54] SUPPORT SYSTEM FOR SUPPORTING A VERTICALLY DISPOSED MULTI-CELL PANEL

[75] Inventor: Terry Akins, Louisville, Colo.

[73] Assignee: Hunter Douglas Inc., Upper Saddle River, N.J.

[21] Appl. No.: 479,610

[22] Filed: Jun. 7, 1995

Related U.S. Application Data

[60] Division of Ser. No. 720,163, Jun. 27, 1991, Pat. No. 5,482,750, which is a continuation-in-part of Ser. No. 635,198, Jan. 2, 1991, abandoned.

[51] Int. Cl.⁶ ..................................................... B32B 3/12
[52] U.S. Cl. ........................... 428/12; 52/793.1; 156/197; 428/116
[58] Field of Search ........................... 428/116, 12, 188; 52/793.1; 156/197; 160/84.05; 493/966

[56] References Cited

U.S. PATENT DOCUMENTS

| | | | |
|---|---|---|---|
| Re. 26,444 | 8/1968 | Paige | 428/116 X |
| Re. 31,129 | 1/1983 | Rasmussen | 428/116 X |
| 765,412 | 7/1904 | Bugwig | 428/116 X |
| 2,610,934 | 9/1952 | Steele | 156/197 |
| 2,734,843 | 2/1956 | Steele | 156/197 |
| 2,803,578 | 8/1957 | Holland | 156/197 X |
| 3,055,419 | 9/1962 | Rubin et al. | 160/84.04 |
| 3,074,839 | 1/1963 | May et al. | 428/116 X |
| 3,077,233 | 2/1963 | Hartsell et al. | 33/307 X |
| 3,082,141 | 3/1963 | Steele et al. | 428/116 X |
| 3,166,456 | 1/1965 | White et al. | 156/197 |
| 3,189,501 | 6/1965 | White | 156/189 |
| 3,953,110 | 4/1976 | Charoudi | 428/116 X |
| 4,247,583 | 1/1981 | Roy | 428/116 |
| 4,288,485 | 9/1981 | Suominen | 428/116 |
| 4,307,768 | 12/1981 | Anderson | 428/116 X |
| 4,346,132 | 8/1982 | Cheng et al. | 428/188 X |
| 4,347,887 | 9/1982 | Brown | 428/116 X |
| 4,388,354 | 6/1983 | Suominen | 428/116 X |
| 4,450,027 | 5/1984 | Colson | 428/116 X |
| 4,603,072 | 7/1986 | Colson | 428/116 |
| 4,631,108 | 12/1986 | Colson | 156/548 X |
| 4,631,217 | 12/1986 | Anderson | 428/188 X |
| 4,673,600 | 6/1987 | Anderson | 428/116 X |
| 4,676,855 | 6/1987 | Anderson | 156/197 X |
| 4,677,012 | 6/1987 | Anderson | 428/116 |
| 4,677,013 | 6/1987 | Anderson | 428/116 |
| 4,732,630 | 3/1988 | Schnebly | 428/116 X |
| 4,849,039 | 7/1989 | Colson et al. | 428/116 X |
| 4,861,404 | 8/1989 | Neff | 428/118 X |
| 4,871,006 | 10/1989 | Kao et al. | 428/116 X |
| 4,885,190 | 12/1989 | Schnebly | 156/197 X |
| 4,934,434 | 6/1990 | Schnebly et al. | 428/116 X |
| 5,002,628 | 3/1991 | Schnebly | 156/379 |
| 5,015,317 | 5/1991 | Corey et al. | 493/413 X |
| 5,094,705 | 3/1992 | Anderson | 156/184 |
| 5,097,884 | 3/1992 | Savcik et al. | 428/116 X |
| 5,160,563 | 10/1992 | Kutchmarek et al. | 156/204 |
| 5,482,750 | 1/1996 | Colson et al. | 428/116 X |

FOREIGN PATENT DOCUMENTS

| 6706563 | 11/1968 | Netherlands | 428/116 |
|---|---|---|---|

*Primary Examiner*—Henry F. Epstein
*Attorney, Agent, or Firm*—Gary M. Polumbus

[57] ABSTRACT

A panel is provided including multiple rows of parallel cells extending transversely of the rows and with the cells of adjacent rows of cells staggered longitudinally of the rows relative to each other, two, three, four and five cell row panels being disclosed. The panels are formed by folded material strips stacked one upon the other with each material strip having portions thereof glued together and adjacent material strips in each stack of strips glued together such that each material strip forms at least one complete cell of one row of cells and at least three-quarters of an adjacent cell in an adjacent row of cells.

Also, a support system is provided for supporting the upper margin of a vertically disposed multi cell row panel wherein an upper cell or cells has one or two horizontal stiffening strips disposed therein and spaced beneath a stationery support strip. One of the stiffening and support strips is provided with headed projections projecting toward the other strip and the other strip includes openings through which the projections may be inserted and retentively retained by the heads on the projections after the projections are forced through the upper wall portions of the cell or cells in which the stiffening strip or strips are received.

1 Claim, 14 Drawing Sheets

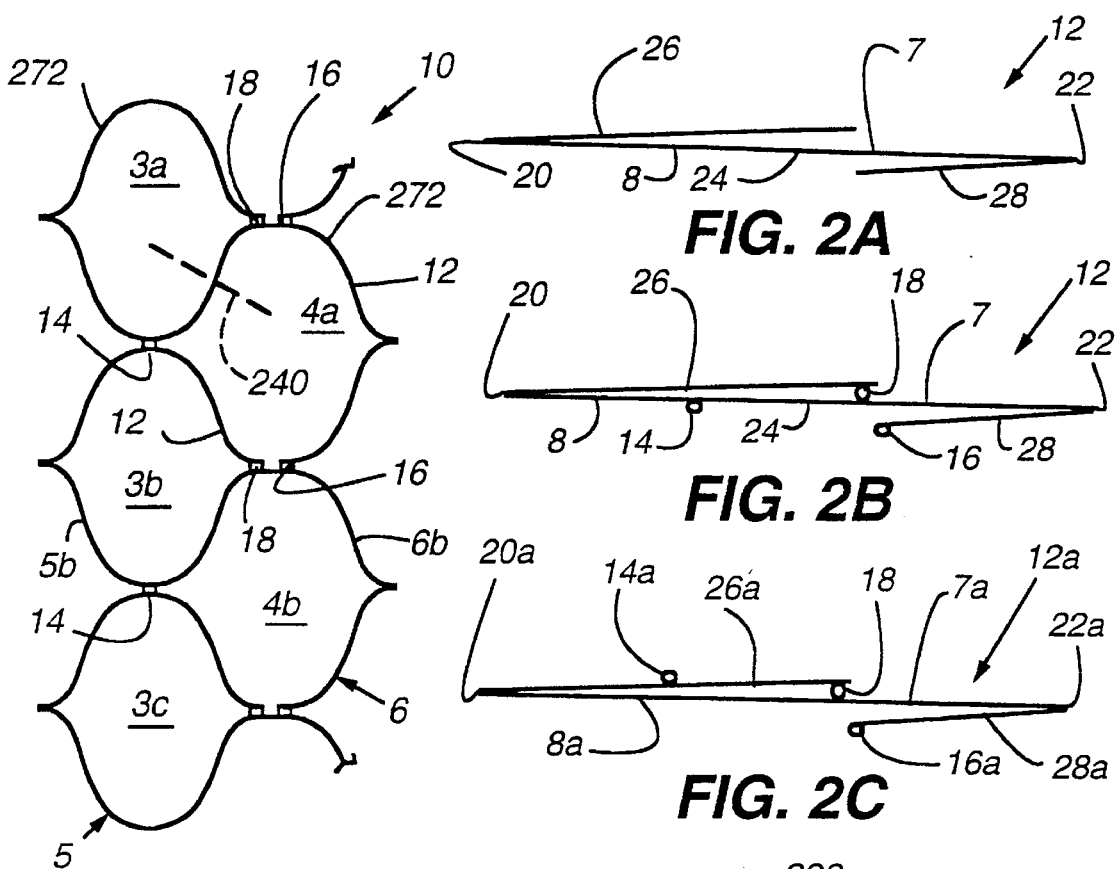
FIG. 2A
FIG. 2B
FIG. 2C
FIG. 1
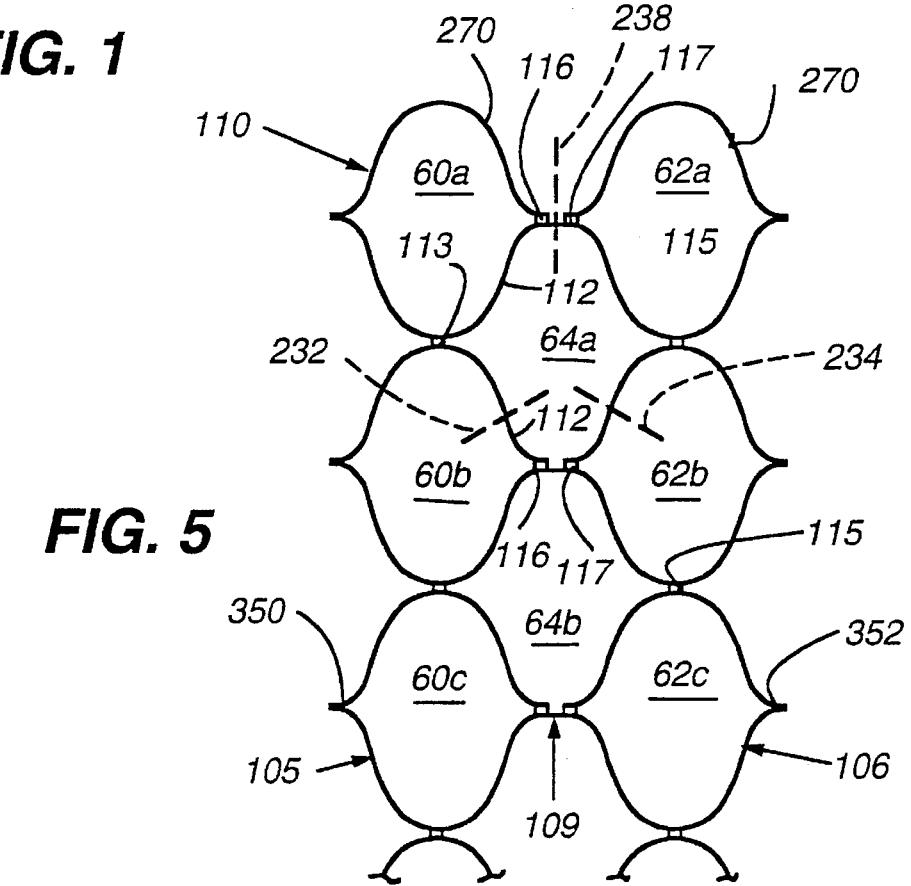
FIG. 5

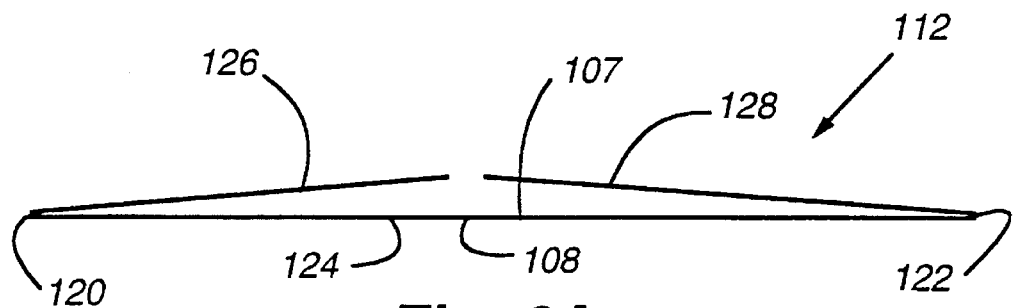
Fig. 6A
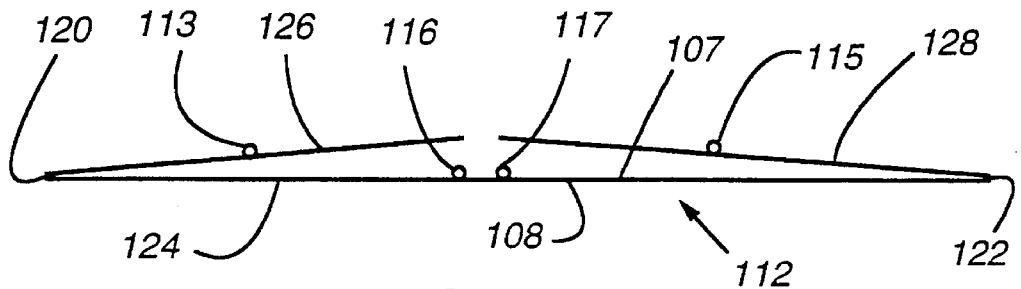
Fig. 6B
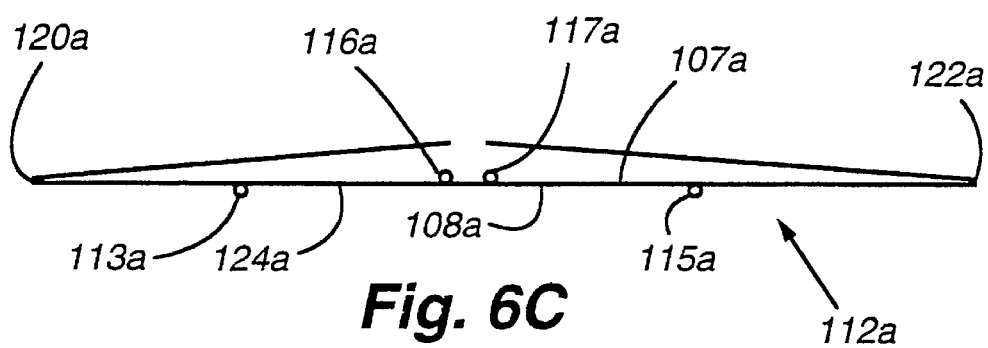
Fig. 6C
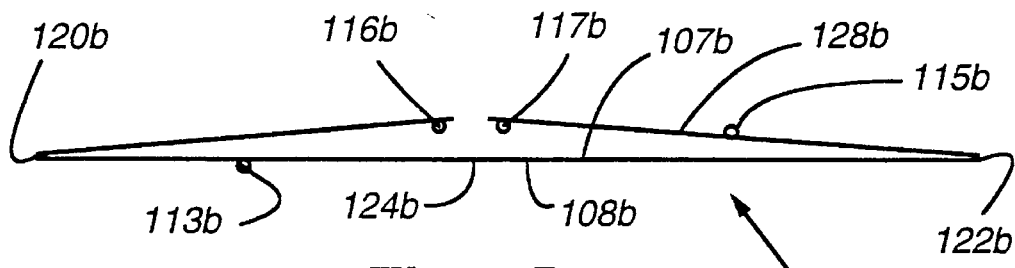
Fig. 6D
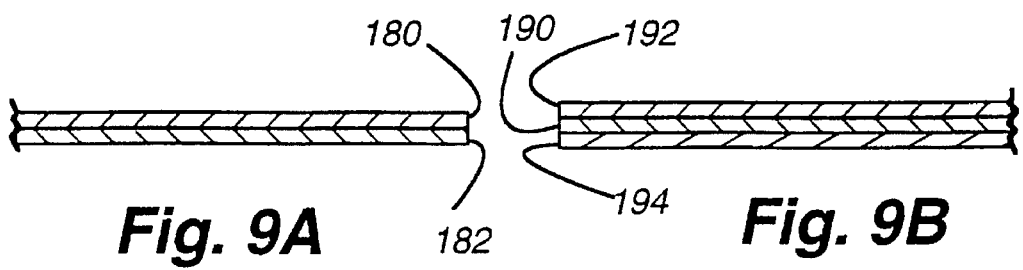
Fig. 9A     Fig. 9B

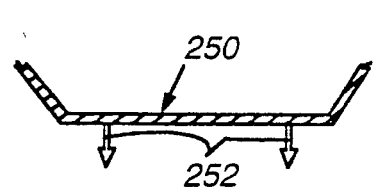
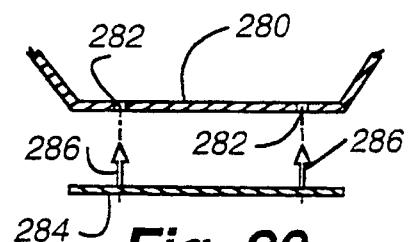
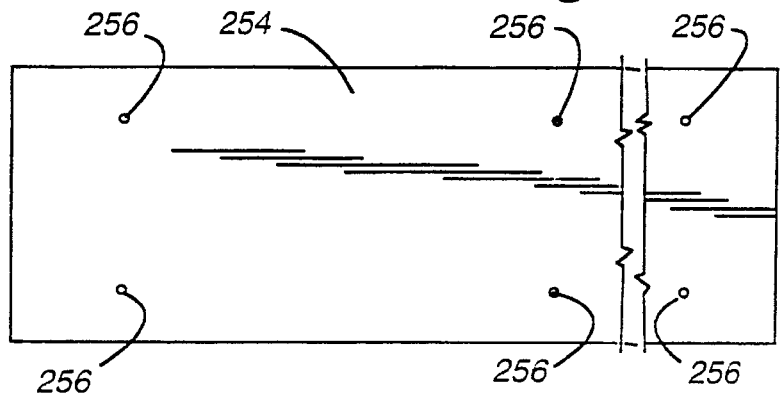
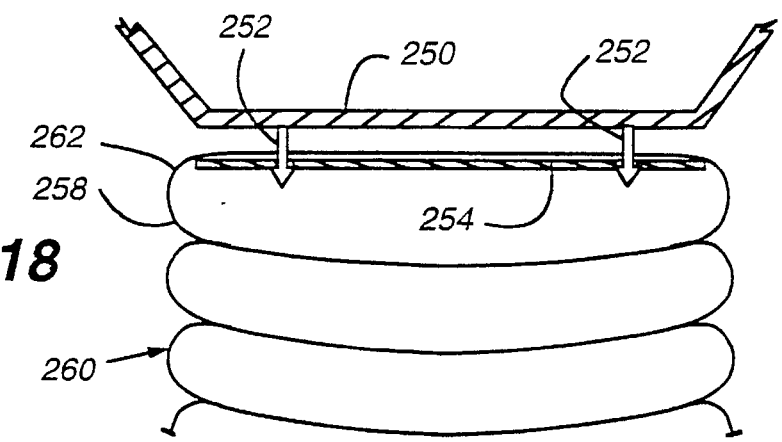
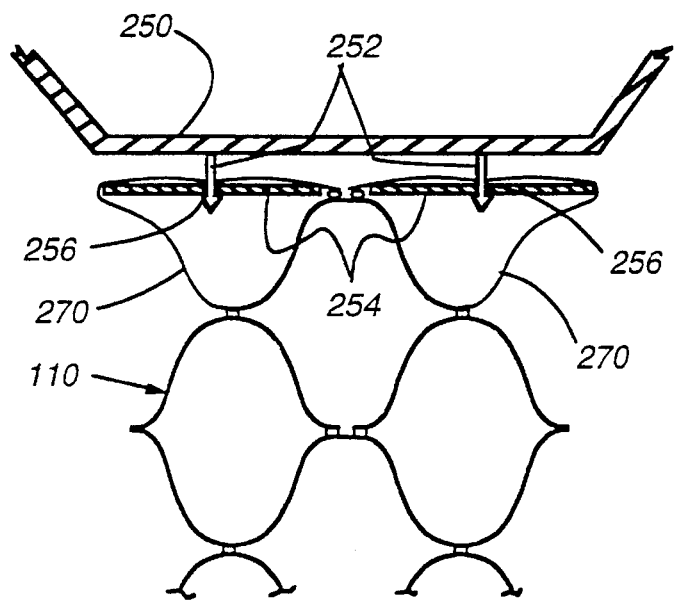

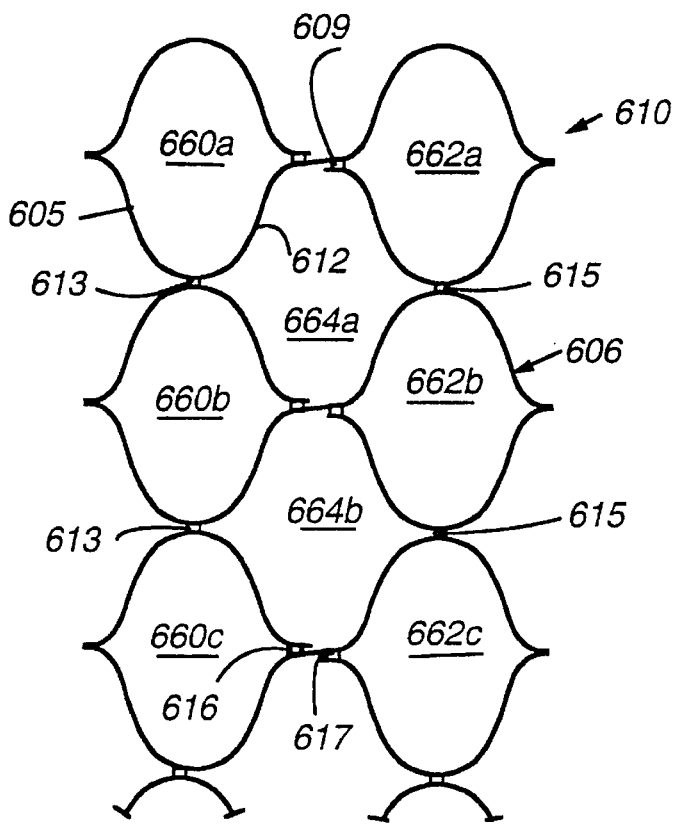
Fig. 22
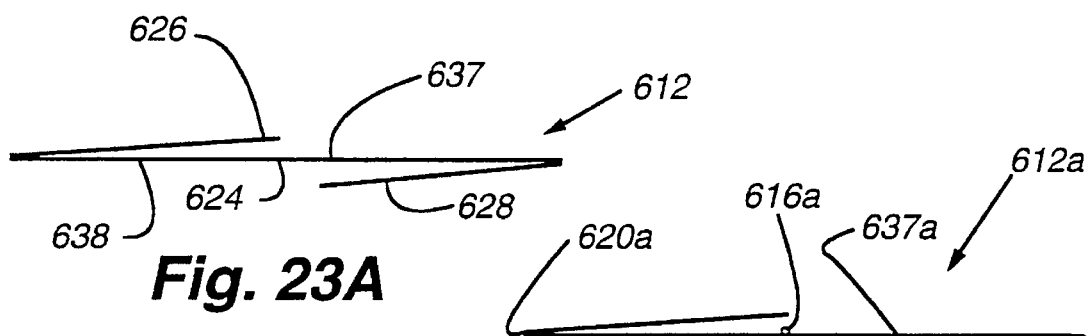
Fig. 23A
Fig. 23C
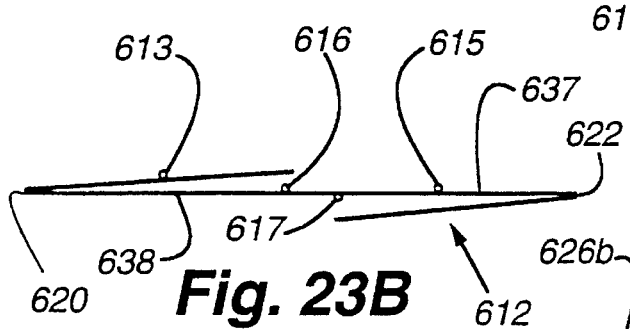
Fig. 23B
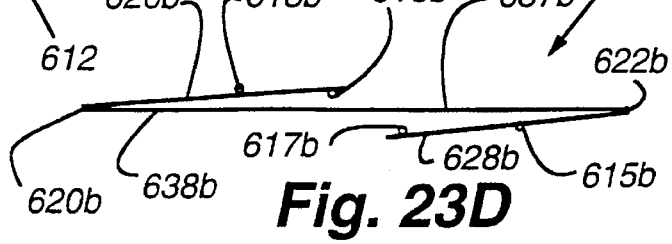
Fig. 23D

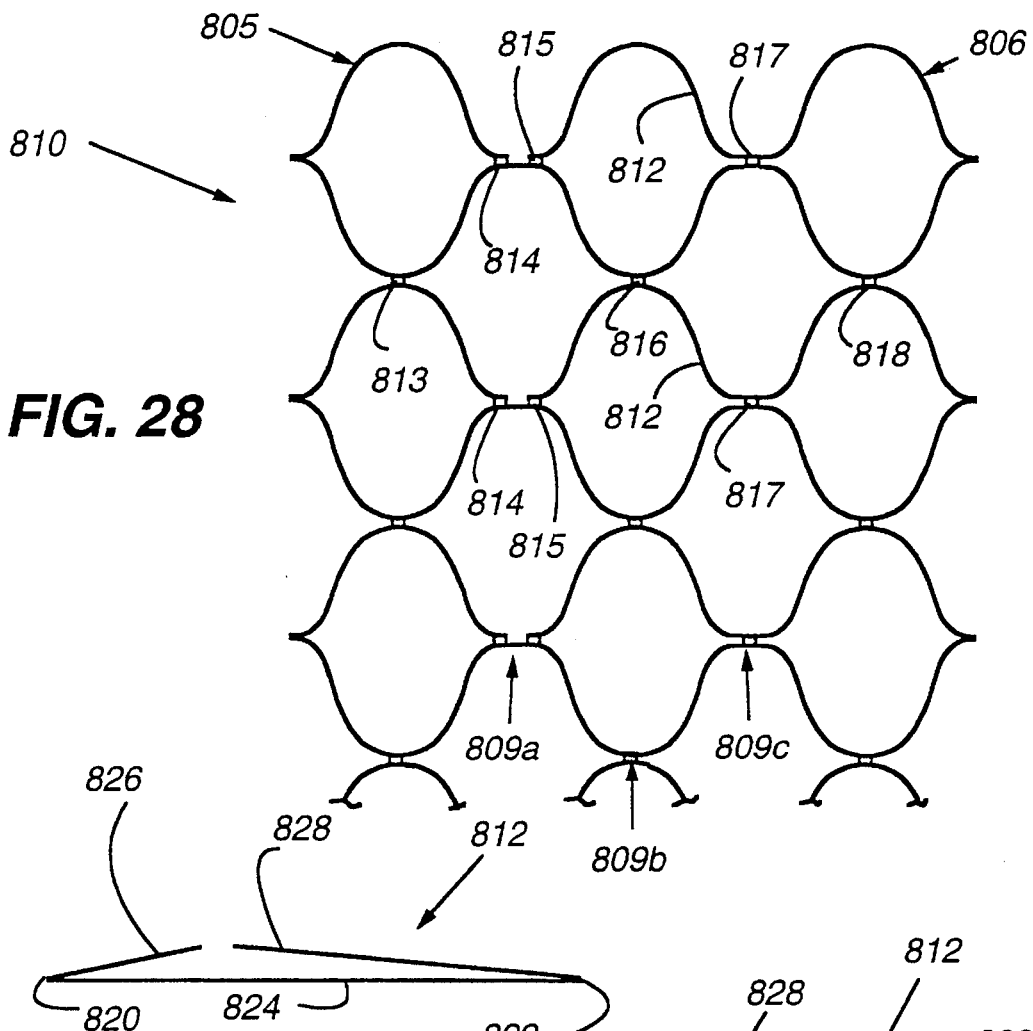
FIG. 28
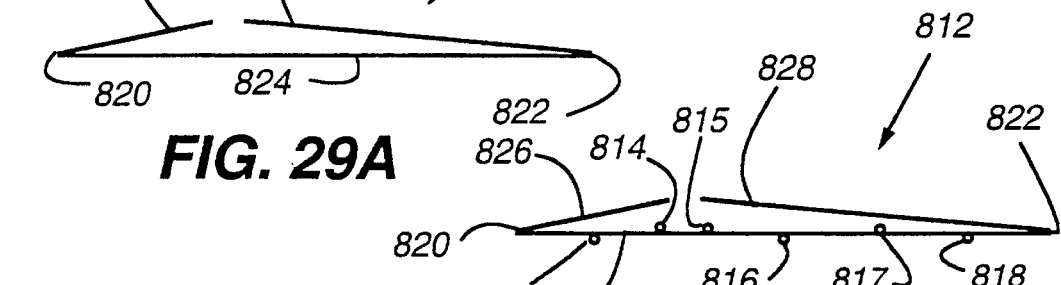
FIG. 29A
FIG. 29B
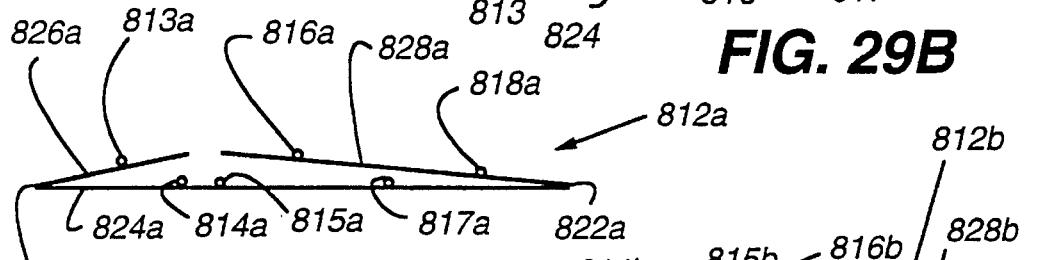
FIG. 29C
FIG. 29D

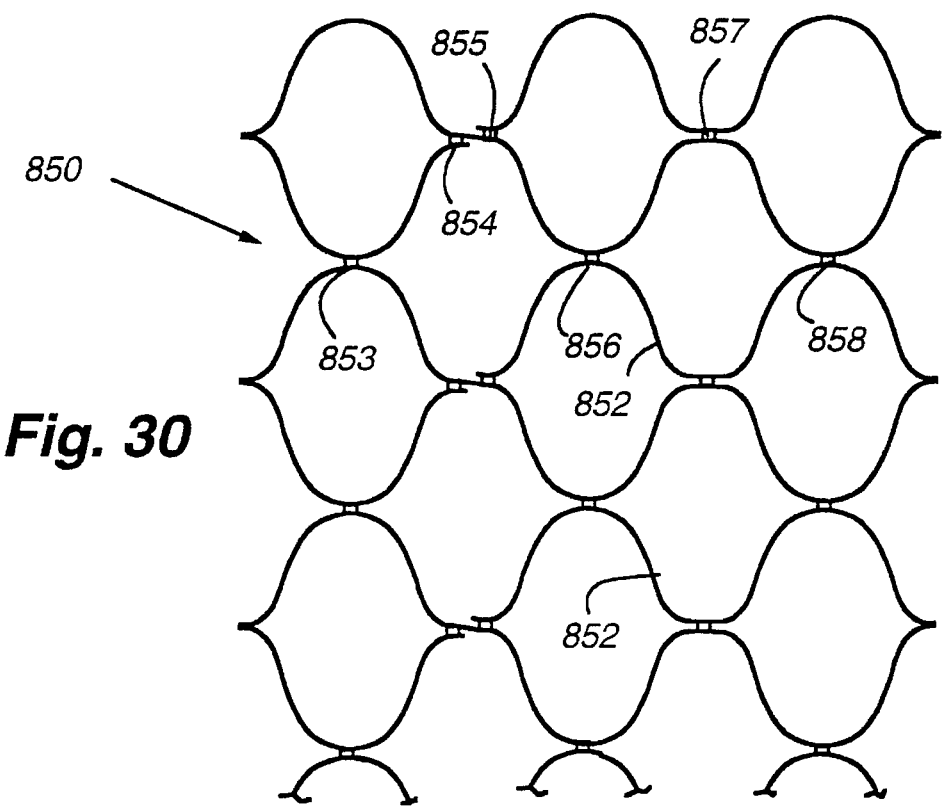
Fig. 30
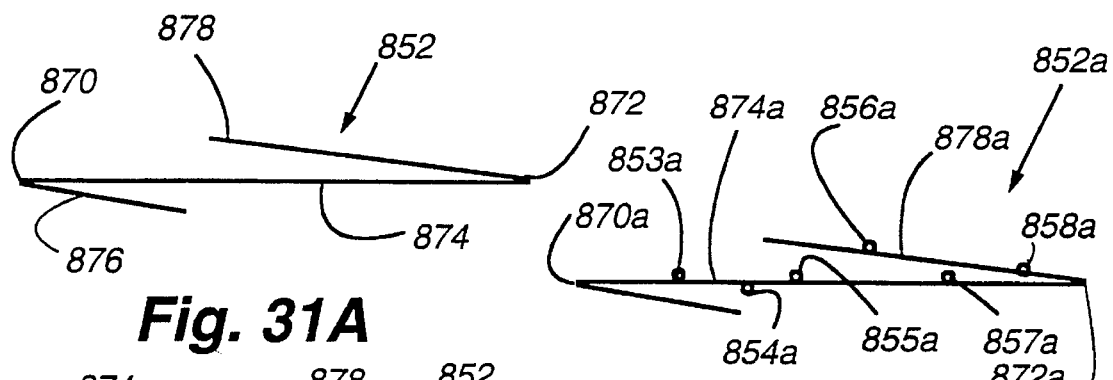
Fig. 31A
Fig. 31C
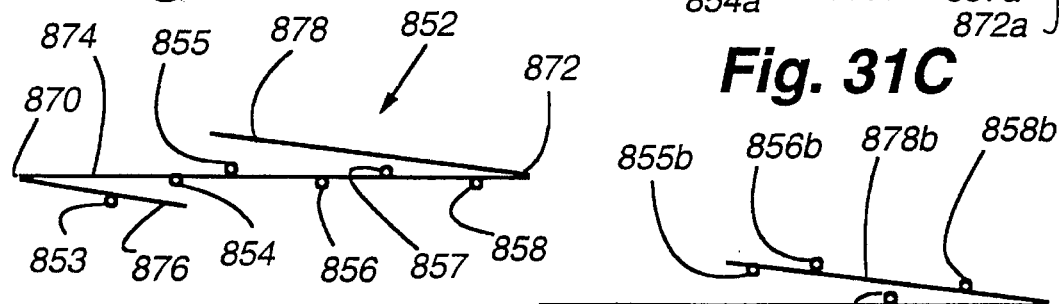
Fig. 31B
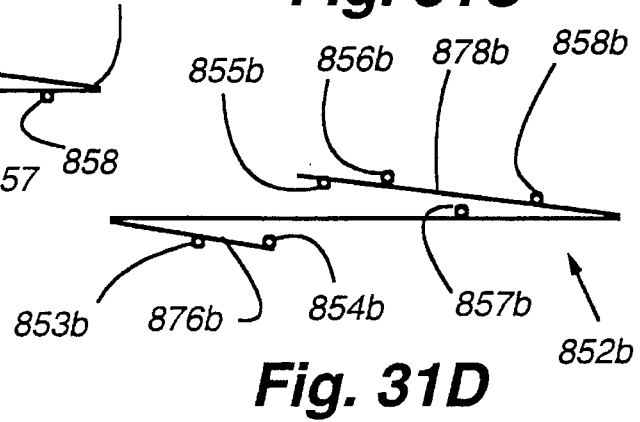
Fig. 31D

5,601,885

SUPPORT SYSTEM FOR SUPPORTING A VERTICALLY DISPOSED MULTI-CELL PANEL

CROSS-REFERENCE TO RELATED APPLICATION

This application is a division of U.S. application Ser. No. 07/720,163 filed Jun. 27, 1991 and now U.S. Pat. No. 5,482,750 which was a continuation-in-part of application Ser. No. 07/635,198 filed Jan. 2, 1991 which is now abandoned.

BACKGROUND OF THE INVENTION

Field of the Invention

The present invention relates to multiple cell honeycomb insulating and shade panels comprising two, three, four, five or more cell rows. The present invention utilizes a novel system of folding, gluing and winding webs or strips of fabric material subsequently to be used in the construction of the honeycomb panels and the specific folding, gluing and winding of the fabric material produces a multiple cell row panel which has the same structural appearance from both sides thereof and which drapes gracefully to provide a panel which is extremely aesthetically pleasing.

Also, the present invention, because of the unique properties of the honeycomb panels, further resides in improved structure and methods of hanging the panels.

SUMMARY OF THE INVENTION

The panel of the instant invention is constructed of a fabric having the ability to be readily folded and creased and to drape in an aesthetically pleasing manner from a fold or crease zone thereof. The fabric of the panel also has the ability to have various sections thereof glued or otherwise bonded together and further has the ability to be supported along a top margin of a vertical multiple cell row panel constructed of such material.

The main object of this invention is to provide a multiple cell honeycomb insulating and shade panel (primarily to be used as a vertical panel and to be supported from the upper margin thereof), which has substantially identically appearing opposite sides which are gracefully creased and folded to provide an aesthetically pleasing appearance.

Another object of this invention is to provide a panel in accordance with the preceding object and which may be readily supported along its upper margin.

A further object of this invention is to provide a multiple cell honeycomb insulating and shade panel which may be constructed so as to comprise a double cell row panel, a triple cell row panel or a cell row panel having four, five or more rows of cells.

Still another important object of this invention is provide method for producing a multiple cell honeycomb insulating and shade panel comprising a double cell row panel or a triple cell row panel.

A final object of this invention to be specifically enumerated herein is to provide a multiple cell honeycomb insulating and shade panel in combination with a new panel support structure for supporting the multiple cell honeycomb insulating and shade panel from the upper margin thereof.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, schematic vertical sectional view illustrating a first embodiment of double cell row panel constructed in accordance with the present invention;

FIG. 2A is a vertical sectional view showing the manner of folding a length of material to produce the double cell row panel of FIG. 1;

FIG. 2B is a schematic vertical sectional view illustrating a first embodiment of the manner in which the material is to be folded and glued in the construction of the panel illustrated in FIG. 1;

FIG. 2C is a schematic vertical sectional view similar to FIG. 2B but illustrating a second embodiment of the manner in which the material is to be folded and glued;

FIG. 5 is a fragmentary, schematic vertical sectional view illustrating a first embodiment of a triple cell row panel constructed in accordance with the present invention;

FIG. 6A is a vertical sectional view showing the manner of folding a length of material to produce the triple cell row panel of FIG. 5;

FIG. 6B is a schematic vertical sectional view illustrating a first embodiment of the manner in which the material is to be folded and glued in the construction of the panel illustrated in FIG. 5;

FIG. 6C is a schematic vertical sectional view similar to FIG. 6B but illustrating a second embodiment of the manner in which the material is to be folded and glued;

FIG. 6D is a schematic vertical sectional view similar to FIG. 6B but illustrating a third embodiment of the manner in which the material is to be folded and glued;

FIG. 9A is a sectional view of a two layer material suitable for use in making a multiple cell row panel of the invention;

FIG. 9B is a sectional view of a three layer material suitable for use in making a multiple cell row panel of the invention;

FIG. 17A is a vertical sectional view of a modified form of header channel to be used in suspending the multiple cell row panels of the present invention;

FIG. 17B is a fragmentary top plan view of a support strip to be used in conjunction with the header channel of FIG. 17A;

FIG. 18 is a fragmentary schematic sectional view illustrating the manner in which a honeycomb shade or panel, including the multiple cell row panels of the invention, may be suspended from its upper margin using the structures illustrated in FIGS. 17A and 17B;

FIG. 19 is a fragmentary schematic vertical sectional view illustrating the manner in which a multiple cell row panel may be supported using two retaining strips in conjunction with a header channel such as that illustrated in FIG. 17A;

FIG. 20 is a fragmentary, exploded schematic vertical sectional view illustrating a second embodiment of a multiple cell panel support structure similar to that of FIGS. 17A and 17B, but with openings being provided in the channel and headed barbs being provided on the stiffening strip;

FIG. 22 is a fragmentary, schematic vertical sectional view illustrating a third embodiment of a triple cell row panel constructed in accordance with the present invention;

FIG. 23A is a schematic vertical sectional view showing the manner of folding a length of material to produce the triple cell row panel of FIG. 22;

FIG. 23B is a schematic vertical sectional view illustrating a first embodiment of the manner in which the material is to be folded and glued in the construction of the panel illustrated in FIG. 22;

FIG. 23C is a schematic vertical sectional view similar to FIG. 23B but illustrating a second embodiment of the manner in which the material is to be folded and glued;

FIG. 23D is a schematic vertical sectional view similar to FIG. 23B but illustrating a third embodiment of the manner in which the material is to be folded and glued;

FIG. 28 is a fragmentary, schematic vertical sectional view illustrating a first embodiment of a five cell row panel constructed in accordance with the present invention;

FIG. 29A is a vertical sectional view showing the manner of folding a length of material to produce the five cell row panel of FIG. 28;

FIG. 29B is a schematic vertical sectional view illustrating a first embodiment of the manner in which the material is to be folded and glued in the construction of the panel illustrated in FIG. 28;

FIG. 29C is a schematic vertical sectional view similar to FIG. 29B but illustrating a second embodiment of the manner in which the material is to be folded and glued;

FIG. 29D is a schematic vertical sectional view similar to FIG. 29B but illustrating a third embodiment of the manner in which the material is to be folded and glued;

FIG. 30 is a schematic vertical sectional view illustrating a second embodiment of a five cell row panel constructed in accordance with the present invention;

FIG. 31A is a vertical sectional view showing the manner of folding a length of material to produce the five cell row panel of FIG. 30;

FIG. 31B is a schematic vertical sectional view illustrating a first embodiment of the manner in which the material is to be folded and glued in the construction of the panel illustrated in FIG. 30.

FIG. 31C is a schematic vertical sectional view similar to FIG. 31B but illustrating a second embodiment of the manner in which the material is to be folded and glued;

FIG. 31D is a schematic vertical sectional view similar to FIG. 31B but illustrating a third embodiment of the manner in which the material is to be folded and glued;

DETAILED DESCRIPTION OF THE INVENTION

Figure 3:
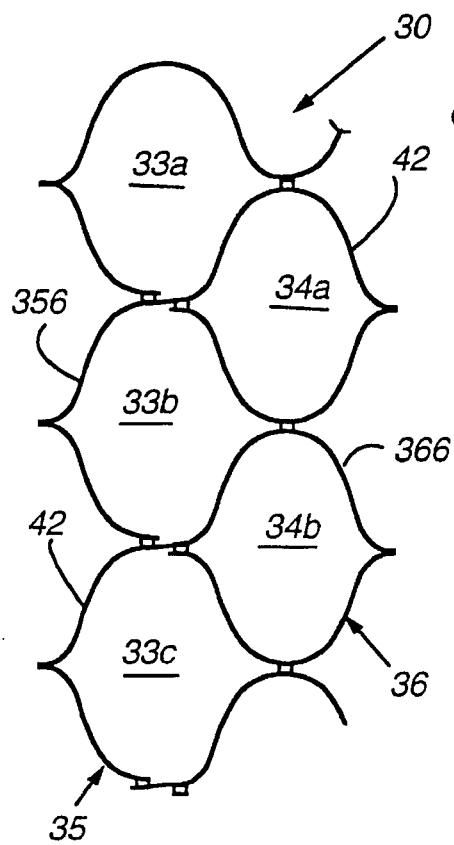
FIG. 3 is a vertical sectional view drawing a second embodiment of a double cell row panel constructed in accordance with the present invention.

Referring now to FIG. 1, there is shown a double cell row panel 10 of the present invention. The double cell row panel 10 is constructed of a plurality of longitudinally extending cells 3a–c, 4a–b. The longitudinally extending cells of the double cell row panel 10 are arranged in two, offset rows 5, 6. For identification purposes only, row 5 is referred to as the front row of the double cell row panel 10 and row 6 is referred to as the back row. Use of the terms "front" and "back" is not to be construed as in any way limiting as to the positioning or orientation of the double cell row panel 10 for use as an insulating shade or window covering.

Each cell has a longitudinally extending front face and a longitudinally extending back face, although only the front faces of the cells of the front row 5 and the back faces of the cells of the back row 6 are ordinarily visible. More particularly, cell 3b has a visible front face 5b and cell 4b has a visible back face 6b.

Each complete cell of the front row 5 is formed from a single piece of material 12. That is, cell 3a is formed from one piece of material 12, cell 3b is formed from another piece of material 12, etc. The back face of an adjacent, offset cell of the back row 6 of double cell row panel 10 is formed from the same piece of material 12 as the adjacent complete cell of the front row 5. For example, the back face 6b of cell 4b is formed from the same piece of material 12 as the adjacent complete cell 3b. As will be described more fully hereinafter, the novel system of folding, gluing, and winding and/or stacking of the material strips 12 of the present invention provides the unique structure of the double cell row panel 10.

As can be seen from FIG. 1, the front faces of the cells of the front row 5 and the back faces of the cells of the back row 6 are formed by opposite sides or surfaces of the material pieces 12. Therefore, if the material 12 is identical in appearance on both sides thereof, panel 10 will have an identical appearance when viewed from the front and from the back. If the material 12 has a different appearance on each side, panel 10 will have a different appearance when viewed from the front and from the back.

To produce the double cell row panel 10, a strip material is creased, folded and provided with glue strips or zones using apparatus similar to that disclosed in U.S. Pat. No. 4,631,217 and U.S. Pat. No. 4,631,108, the disclosures of which are incorporated herein by reference. The apparatus and method for producing the multiple cell row panels, including double cell row panel 10, will be described in detail hereinafter, The general manner of folding and providing a strip material with glue lines to produce the double cell row panel 10 is schematically illustrated in FIGS. 2A–2C. First, longitudinal crease lines 20, 22 are defined on opposite sides of a foldable, creasable strip material. One of the crease lines is formed between one longitudinal edge of the material and a central portion of the material and the other crease line is formed on the opposite side of the material between the other longitudinal edge of the material and the central portion of the material.

After the creases have been formed, the strip material is folded longitudinally along the crease lines 20, 22. The folding is such as to fold one longitudinal edge over one side of the material along one crease line and to fold the other longitudinal edge over the opposite side of the material along the other crease line. This type of folding is referred to hereinafter as "Z-folding." The folded condition of the length of strip material 12 is shown in FIG. 2A. As there seen, the material 12 is initially of a width equal to six width units. The center portion 24 of the folded material 12 comprises approximately three width units, the downwardly and inwardly folded longitudinal margin 28 comprises approximately one width unit and the upwardly and inwardly folded longitudinal margin 26 comprises approximately two width units.

After the material 12 has been folded as in FIG. 2A, three glue or adhesive lines or zones are applied longitudinally on the folded material 12. A first adhesive line or zone is applied to one surface 7 of the folded material 12 in a location suitable for securing the free edge of the longitudinal margin 26 to the central portion 24 of the folded material 12, as shown in FIGS. 2B and 2C. This first adhesive strip or line 18, in FIG. 2B, is located substantially one unit width from the fold or crease 22.

Two additional adhesive or glue lines 14, 16 are also applied to the folded material 12. In the embodiment of FIG. 2B, two of the adhesive lines 16, 18 are located on one surface 7 of the material 12 and the third adhesive strip or line 14 is located on the opposite surface 8 of the material 12 from the adhesive strips 16, 18. The adhesive strip 14 is located on the surface 8 of the center portion 24, substantially one width unit from fold or crease 20, and the adhesive strip 16 is located adjacent the free edge of margin 28.

An alternative placement of the three adhesive lines on the folded material 12a to produce double cell row panel 10 is shown in FIG. 2C. In this embodiment, adhesive line 16a is located adjacent the free edge of margin 28a and the adhesive line 14a is located on the surface 8a at substantially the midpoint of margin 26a, about one width unit from fold or crease 20a. Adhesive strip or line 18a is located substantially one width unit from the fold or crease 22a. Again, the adhesive strips 16a, 18a are provided on one surface 7a of the material 12a and the adhesive strip 14a is provided on the other surface 8a of the material 12a.

The folded material with the three adhesive or glue lines disposed thereon as shown in FIGS. 2B or 2C is wound or stacked such that successive portions of the material overlie preceding portions, as described in detail hereinafter, to form a plurality of adjacent stacked layers of folded material. During this stacking, the adhesive lines on the folded material are pressed into engagement with the facing side of an adjacent layer of folded material to connect them together and form adjacent connected layers. These adjacent connected layers form a stack of double cell rows having the structure shown in FIG. 1.

A second embodiment of a double cell row panel according to the present invention is shown in FIG. 3. The double cell row panel 30, like the double cell row panel 10 of FIG. 1, is constructed of a plurality of longitudinally extending cells. The longitudinally extending cells 33a–c, 34a–b of the double cell row panel 30 are arranged in two, offset rows 35, 36. Each cell has a longitudinally extending front face and a longitudinally extending back face, although only the front faces of the cells of the front row and the back faces of the cells of the back row are ordinarily visible. More particularly, cell 33b has a visible front face 35b and cell 34b has a visible back face 36b.

Each complete cell of the back row 36 is formed from a single piece of material 42, that is, cell 34a is formed from one piece of material 42, cell 34b is formed from another piece of material 42, etc. The front face of the adjacent, offset cell of the front row 35 of double cell row panel 30 is formed from the same piece of material as the adjacent complete cell of the back row 36. For example, the front face 35b of cell 33b is formed from the same piece of material 42 as the adjacent complete cell 34a. As described more fully hereinafter, the novel system of folding, gluing and stacking of the material in accordance with the present invention provides the unique structure of the double cell row panel 30.

As can be seen from FIG. 3, the front faces of the cells of the front row 35 and the back faces of the cells of the back row 36 are formed by the same surface of the material 42. Therefore, the double cell row panel 30 has an identical appearance when viewed from the front and from the back, provided that the material 42 has not been selected or printed to produce a different appearance from the front or back.

Figure 4A:
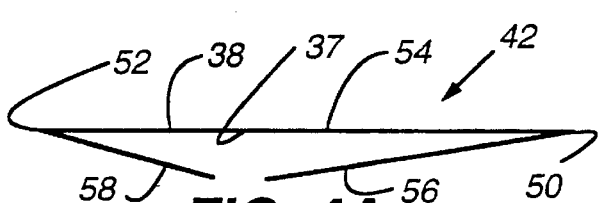
FIG. 4A is a vertical sectional view showing the manner of folding a length of material to produce the double cell row panel of FIG. 3.
Figure 4B:
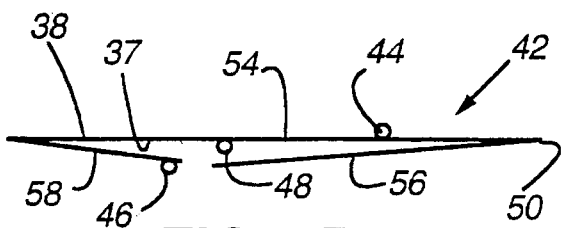
FIG. 4B is a schematic vertical sectional view illustrating a first embodiment of the manner in which the material is to be folded and glued in the construction of the panel illustrated in FIG. 3.
Figure 4C:
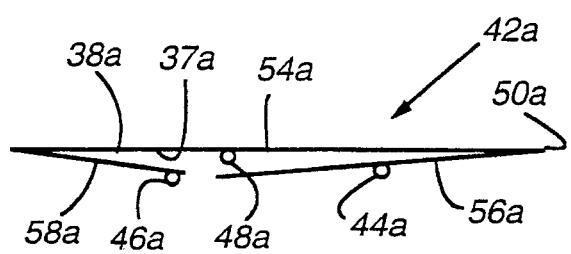
FIG. 4C is a schematic vertical sectional view similar to FIG. 4B but illustrating a second embodiment of the manner in which the material is to be folded and glued.

To produce the double cell row panel 30, material is creased, folded and provided with glue strips or lines as generally discussed above with reference to FIG. 1 and as detailed hereinafter. The method of producing the double cell row panel 30 of FIG. 3 differs from the method of producing the double cell row panel 10 of FIG. 1 primarily in the manner of folding the material. In contrast to the Z-folded condition of the material shown in FIG. 2A for producing the double cell row panel 10 of FIG. 1, as shown in FIG. 4A, to produce the double cell row panel 30 of FIG. 3, both longitudinal edges of the material 42 are folded over the same side 37 of the material 42. This type of folding is referred to hereinafter as "C-folding." However, like the folded material of FIG. 2A, the folded material of FIG. 4A comprises a center portion 54 of approximately three width units between folds 50 and 52, a first inwardly folded longitudinal margin 58 comprising approximately one width unit and a second inwardly folded longitudinal margin 56 comprising approximately two width units. After the material 42 has been folded as in FIG. 4A, three glue or adhesive lines are applied longitudinally on the folded material 42. A first adhesive line or zone is applied to one surface 37 of the folded material 42 in a location suitable for securing the free edge of the longitudinal margin 56 to the central portion 54 of the folded material 42, as shown in FIGS. 4B and 4C. This first adhesive strip or line 48, in FIG. 4B, is located substantially two unit widths from the fold or crease 50.

Two additional adhesive or glue lines 44, 46 are also applied to the folded material 42. In the embodiment of FIG. 4B, two of the adhesive or glue lines 44, 46 are located on one surface 38 of the material 42 and the third adhesive or glue line 48 is located on the opposite surface 37 of the material 42 from the adhesive strips 44, 46. The adhesive strip 44 is located approximately one unit width from the crease or fold 50 and the adhesive strip 26 is located adjacent the free edge of margin 58.

An alternative placement of the three adhesive or glue lines on the folded material 42a to produce the double cell row panel 30, is shown in FIG. 4C. In this embodiment, adhesive line 46a is located adjacent the free edge of margin 58a and the adhesive line 44a is located at substantially the midpoint of the margin 56a. Again, the adhesive strips 44a, 46a are provided on one surface 38a of the material 42a and the adhesive strip 48a is provided on the other surface 37a of the material 42a about two unit widths from fold 50a.

As will be discussed in detail hereinafter, the folded material with the three adhesive or glue lines disposed thereon as shown in FIG. 4B or 4C is subsequently wound and/or stacked such that successive portions of the material overlie preceding portions, to form a plurality of adjacent stacked layers of folded material. During the stacking, the adhesive lines of the folded material are pressed into engagement with the facing side of an adjacent layer of folded material to connect them together and form adjacent connected layers. These adjacent connected layers form a stack of double cell rows having the structure shown in FIG. 3.

Referring now to FIG. 5, there is shown a triple cell row panel 110 constructed according to the present invention. Like the double cell row panels described above, the triple cell row panel 110 is constructed from a plurality of folded and glued material strips, designated by the reference numeral 112. However, to produce the triple cell row panel 110, the material is folded and glued at different locations than the materials 12, 42 used to produce the double cell row panel 10, 30, respectively.

The triple cell row panel 110, as shown in FIG. 5, comprises three rows of longitudinally extending cells, a front row 105, a back row 106 and an offset middle row 109 located between the front and back rows. The cells in the front row 105 extend longitudinally, substantially parallel to corresponding cells in the back row 106, and these parallel cells may be considered as a cell pair. With reference to FIG. 5, cells 60a and 62a form one such cell pair, cells 60b and 62b form another cell pair, cells 60c and 62c form another cell pair, and so on. The cells of the middle row 109 are formed by gluing two such cell pairs together as shown in FIG. 5. That is, gluing cell 60a to cell 60b along glue strip 113 and gluing cell 62a to cell 62b along glue strip 115 forms cell 64a of the middle row 109. Similarly, gluing cell 60b to cell 60c along glue line 113 and gluing cell 62b to cell 62c along glue line 115 forms cell 64b of the middle row 109.

Each cell pair, e.g., 60a, 62a, of the triple cell row panel 110 is formed from a single, folded material strip 112. Because of the way the material strip is folded, i.e., C-folded as described below, the same surface of the material 112 forms the front face of the front row cell of the cell pair and the back face of the back row cell of the cell pair. Therefore, the triple cell row panel 110 has an identical appearance from the front and the back, unless the material 112 has been selected or printed to produce a different appearance from the front and back.

The folding is such as to fold each longitudinal edge over the same side of the material along the respective crease lines. The folded condition of the length of material 112 used to produce the triple cell row panel 110 is shown in FIG. 6A. As there seen, the material 112 is initially of a width equal to eight width units. The center portion 124 of the folded material 112 comprises approximately four width units, and the upwardly and inwardly folded longitudinal margins 126, 128 each comprise approximately two width units.

Four glue or adhesive lines are applied to the folded material 112, to connect stacked or wound lengths of the folded material to one another to produce the triple cell row panel 110. FIGS. 6B–6D show several embodiments of the positioning of the four glue lines on the folded material 112 to produce the triple cell row panel 110 shown in FIG. 5. In the embodiments of FIGS. 6B–6D, two parallel adhesive strips or zones are applied to one surface 107 of the folded material 112 in locations suitable for securing the free edges of the longitudinal margins 126, 128 to the central portion 124 of the folded material 112. In FIG. 6B, these first adhesive strips or zones 116, 117 are located substantially equidistant from their respective folds 120, 122. Two additional adhesive strips or zones 113, 115 are located on the opposite surface 108 of the material 112 from the adhesive strips 116, 117 in the embodiment of FIG. 6B. The adhesive strip 113 is located at substantially the midpoint of the margin 126 and the adhesive strip 115 is located at substantially the midpoint of margin 128.

A second embodiment of the folded material 112a with the four adhesive strips applied thereto is shown in FIG. 6C. In this embodiment, adhesive strips 113a, 115a are located on the opposite surface 108a of the central portion 124a from the adhesive strips 116a, 117a. Adhesive strip 113a is located approximately one unit width from the crease or fold 120a and adhesive strip 115a is located approximately one unit width from fold or crease 122a. Again, the adhesive strips 113a, 115a are provided on one surface 108a of the material 112a and the adhesive strips 116a, 117a are provided on the other surface 107a of the material 112a.

Another embodiment of the folded material 112b with four adhesive strips applied thereto is shown in FIG. 6D. In this embodiment, adhesive strips 116b, 117b are applied to the surface 107b of the material 112b, adjacent the free edges of the margins 126b, 128b. Adhesive strips 113b, 115b are applied to opposite sides, i.e., upper and lower sides, of the folded material 112b as shown in FIG. 6D. Adhesive strip 113b is applied to the surface 108b of the central portion 124b of the material 112b, approximately one width unit from the fold 120b. Adhesive strip 115b is applied to the surface 108b of the material 112b at approximately the midpoint of the margin 128b. Again, in this embodiment the adhesive strips 113b, 115b are applied to one surface 108b of the material 112b and the adhesive strips 116b, 117b are applied to the other surface 107b of the material 112b.

Figure 7:
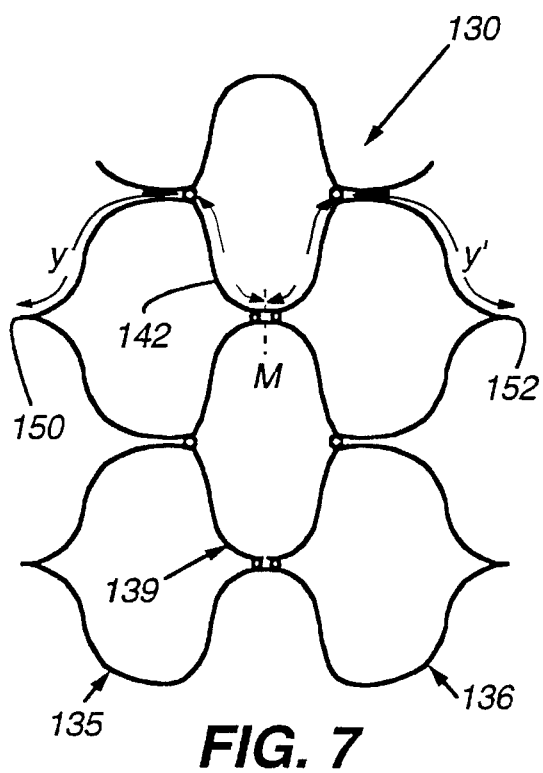
FIG. 7 is a fragmentary, schematic vertical sectional view illustrating a second embodiment of a triple cell row panel constructed in accordance with the present invention.

A second embodiment of a triple cell row panel of the present invention is shown in FIG. 7. The triple cell row panel 130 shown in FIG. 7 is an "offset" honeycomb panel, meaning that the cells of the middle row 139 are of a different size, in this case smaller, and have a different configuration than those of the front row 135 and the back row 136. In the offset triple cell row panel 130, the distance x from the glue line 143 to the midpoint M of the folded material 142 is less than the distance y from the glue line 143 to the fold 150. Similarly, the distance x' from the glue line 145 to the midpoint M of the folded material 142 is less than the distance y' the glue line 145 to the fold 152. As the distances x and x' decrease by moving the glue lines 143 and 145, respectively, closer to the midpoint M of the folded material 142, the sizes of the cells of the front row 135 and the back row 136 increase and the size of the cells of the middle row 139 decrease.

Figure 8A:
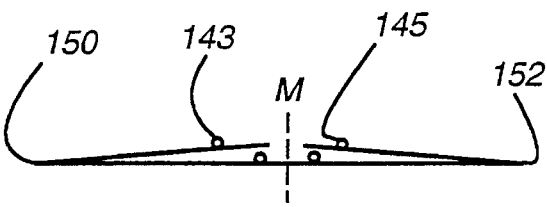
FIG. 8A is a schematic vertical sectional view illustrating a first embodiment of the manner in which the material is to be folded and glued in the construction of the panel illustrated in FIG. 7.
Figure 8B:
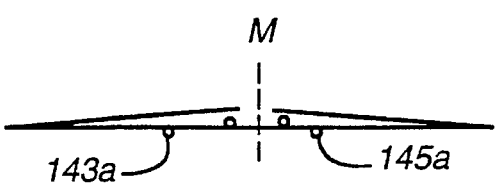
FIG. 8B is a schematic vertical sectional view similar to FIG. 8A but illustrating a second embodiment of the manner in which the material is to be folded and glued.
Figure 8C:
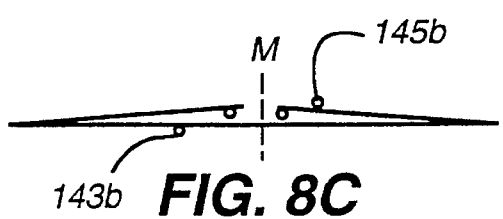
FIG. 8C is a schematic vertical sectional view similar to FIG. 8A but illustrating a third embodiment of the manner in which the material is to be folded and glued.

To produce the offset triple cell row panel 130, the glue lines on the outer surface 138 of the folded material 142 are moved closer to the midpoint M of the folded material 142 than the corresponding glue lines shown in FIGS. 6B–6D. More particularly, as shown in FIG. 8A, glue lines 143, 145 are farther from their respective folds 150, 152 than corresponding glue lines 113, 115 in FIG. 6B. Similarly, in the embodiment of FIG. 8B, glue lines 143a, 145a are closer to midpoint M of the folded material 142a than corresponding glue lines 113a, 115a of FIG. 6C. Glue lines 143b, 145b of FIG. 8C are similarly displaced relative to respective glue lines 113b, 115b of FIG. 6D.

A third embodiment of a triple cell row panel of the present invention is shown in FIG. 22. The triple cell row panel 610, like the triple cell row panel 110 of FIG. 5, is constructed of a plurality of longitudinally extending cells. The triple cell row panel 610 is constructed from a plurality of folded and glued material strips, designated by the reference numeral 612.

The triple cell row panel 610, as shown in FIG. 22, comprises three rows of longitudinally extending cells, a front row 605, a back row 606 and an offset middle row 609 located between the front and back rows. The cells in the front row 605 extend longitudinally, substantially parallel to corresponding cells in the back row 606, and these parallel cells may be considered as a cell pair. With reference to FIG. 22, cells 660a and 662a form one such cell pair, cells 660b and 662b form another cell pair, cells 660c and 662c form another cell pair, and so on. The cells of the middle row 609 are formed by gluing two such cell pairs together as shown in FIG. 22. That is, gluing cell 660a to cell 660b along glue strip 613 and gluing cell 662a to cell 662b along glue strip 615 forms cell 664a of the middle row 609. Similarly, gluing cell 660b to cell 660c along glue line 113 and gluing cell 662b to cell 662c along glue line 615 forms cell 664b of the middle row 609. Each cell pair, for example, 660a, 662a, of the triple cell row panel 610 is formed from a single, folded material strip 612. Because of the way the material strip is folded, i.e., Z-folded as described below, the front faces of the cells of the front row 605 and the back faces of the cells of the back row 606 are formed by opposite sides or surfaces of the material strip 612. Therefore, if the material 612 is identical is appearance on both sides thereof, panel 610 will have an identical appearance when viewed from the front and from the back. If the material 612 has a different appearance on each side or surface, panel 610 will have a different appearance when viewed from the front and from the back.

To produce the triple cell row panel 610, material is creased, folded and provided with glue strips or lines as generally discussed above with reference to FIG. 5 and as detailed hereinafter. The method of producing the triple cell row panel 610 of FIG. 22 differs from the method of producing the triple cell row panel 110 of FIG. 5 primarily in the manner of folding the material. In contrast to the C-folded condition of the material shown in FIG. 6a for producing the triple cell row panel 110 of FIG. 5, to produce the triple cell row panel 610 of FIG. 22, as shown in FIG. 23A, the material is Z-folded. That is, to produce the triple cell row panel 610 of FIG. 22, one longitudinal edge of the material 612 is folded over one surface 637 of the material 612 along one crease line and the other longitudinal edge is folded over the opposite surface 638 of the material along the other crease line. The Z-folded condition of the length of strip material 612 is shown in FIG. 23A. As there seen, the material 612 is initially of a width equal to eight width units. The center portion 624 of the folded material 612 comprises approximately four width units, and the upwardly and inwardly folded longitudinal margin 626 comprises approximately two width units and the downwardly and inwardly folded longitudinal margin 628 comprises approximately two width units.

Four glue or adhesive lines are applied to the folded material 612, to connect stacked or wound lengths of the folded material to one another to produce the triple cell row panel 610. FIGS. 23B–23D show several embodiments of the positioning of the four glue lines on the folded material 612 to produce the triple cell row panel 610 shown in FIG. 22. In the embodiments of FIGS. 23B–23D, two parallel adhesive strips or zones are applied to opposite surfaces 637, 638 of the folded material 612 and locations suitable for securing the free edges of the longitudinal margin 626, 628 to the center portion 624 of the folded material 612. In FIG. 23B, the first adhesive strips or zones 616, 617 are located on opposite surfaces 637, 638, respectively, of the central web portion 624, substantially equidistant from their respective folds 620, 622. Two additional adhesive strips or zones 613, 615 are provided on opposite surfaces, 638, 637, respectively, of the material 612. The adhesive strip 613 is located at substantially the midpoint of the margin 626 and the adhesive strip 615 is located on the central web portion 624, approximately one width unit from the fold 622.

A second embodiment of the folded material 612a with the four adhesive strips applied thereto is shown in FIG. 23C. In this embodiment, adhesive strip 613a is located on surface 638a of the central portion 624a, approximately one width unit from the fold 620a. Adhesive strip 615a is located at substantially the midpoint of margin 628a on surface 637a of material 612a. Adhesive strips 616a and 617a are again located on opposite surfaces, 637a, 638a, respectively, of central portion of 624a.

Another embodiment of the folded material 612b with four adhesive strips applied thereto is shown in FIG. 23D. In this embodiment, adhesive strip 616b is applied to surface 637b of the folded material 612b, adjacent the free edge of the margin 626b. Adhesive strip 617b is applied to the surface 638b, adjacent the free edge of the margin 628b. Adhesive strip 613b, 615b are applied to opposite sides, i.e., upper and lower sides, of the folded material 612b as shown in FIG. 23D. Adhesive strip 613b is applied to the surface 638b of the longitudinal margin 626b, approximately one width unit from the fold 620b. Adhesive strip 615b is applied to the surface 637b of the material 612b at approximately the midpoint of the margin 628b.

In each of the embodiments shown in FIGS. 23B–23D, two of the adhesive strips are applied to one surface 638 of the material 612 and the other two adhesive strips are applied to the other surface 637 of the material 612.

Figure 24:
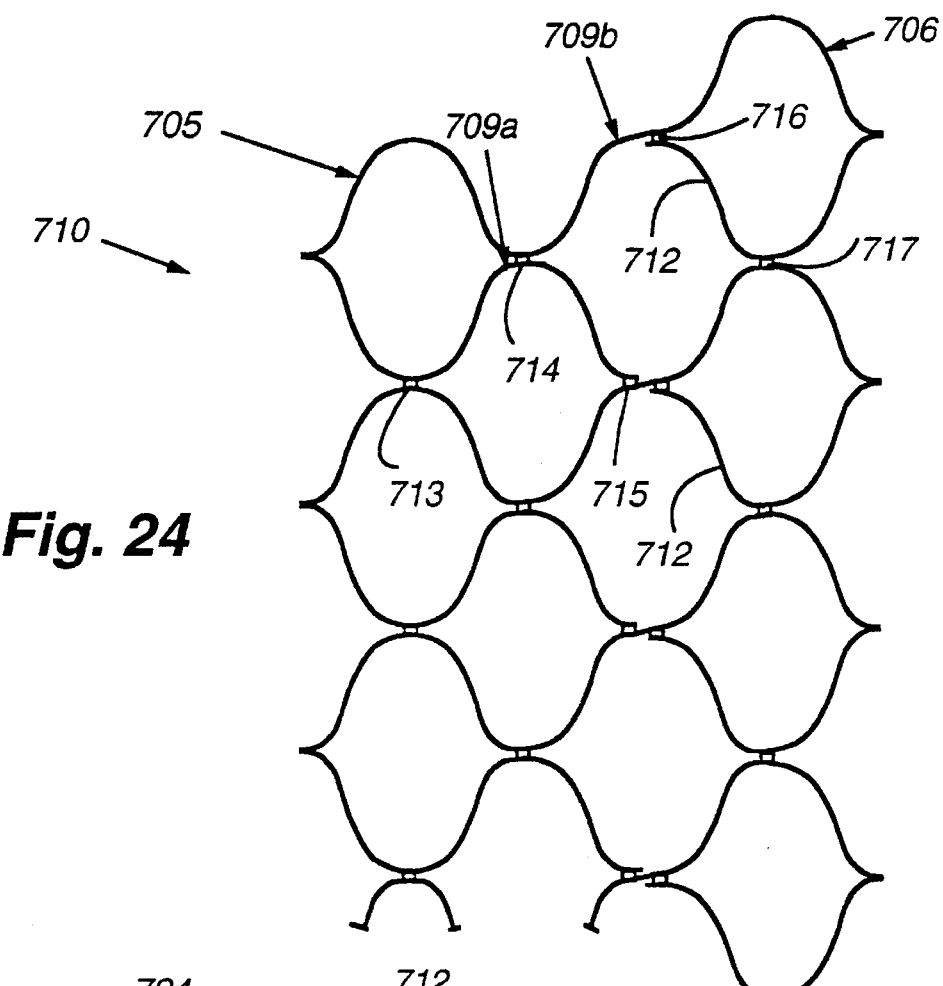
FIG. 24 is a fragmentary, schematic vertical sectional view illustrating a first embodiment of a four cell row panel constructed in accordance with the present invention.

Referring now to FIG. 24, there is shown a four cell row panel 710 constructed according to the present invention. Like the double and triple cell row panel described above, the four cell row panel 710 is constructed from a plurality of folded and glued material strips, designated by the reference number 712. However, to produce the four cell row panel 712, the material is folded and glued at different locations than the material is used to produce the double and triple cell row panels.

The four cell row panel 710, as shown in FIG. 24, comprises four rows of longitudinally extending cells, a front row 705, a back row 706 and two offset middle rows 709a, 709b, located between the front and back rows.

Figure 25A:
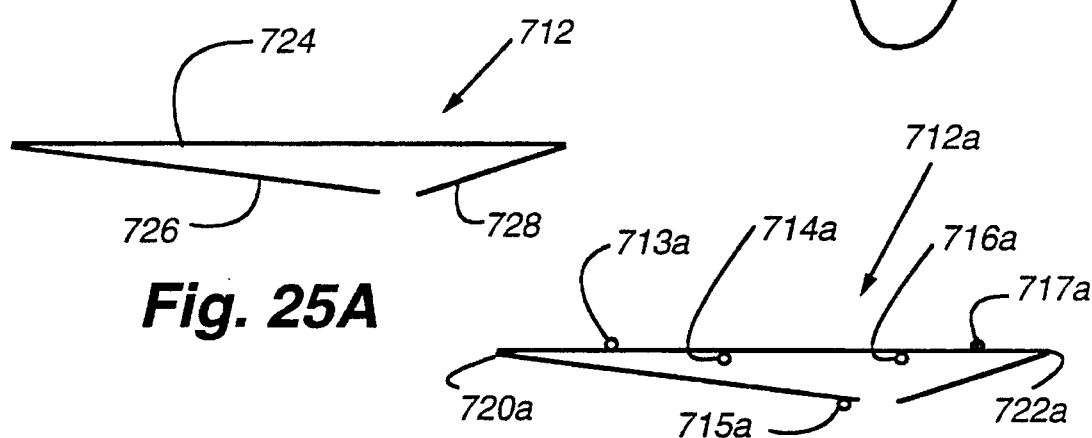
FIG. 25A is a vertical sectional view showing the manner of folding a length of material to produce the four cell row panel of FIG. 24.

The C-folded condition of the material strip 712 is shown in FIG. 25A. As there seen, the material strip 712 is initially of a width equal to ten width units. The center portion 724 of the folded material 712 comprises approximately five width units, the downwardly and inwardly folded longitudinal margin 726 comprises approximately three width units, and the downwardly and inwardly folded longitudinal margin 728 comprises approximately two width units.

After the material 712 has been folded as shown in FIG. 25A, five adhesive or glue lines or zones are applied longitudinally on the folded material 712. Adhesive line 716 is applied on one surface of the material 712, approximately two width units from fold 722, to secure the free edge of longitudinal margin 728 to the center portion 724. Adhesive line 714 is applied to the same surface of the material 712 as adhesive line 716, approximately two width units from fold 720 and one width unit from adhesive line 716. A portion of longitudinal margin 726 about two width units from the fold 720 is secured to the central portion 724 by the adhesive line 714. Adhesive lines 713, 715 and 717 are applied to the opposite surface of the material 712. Adhesive line 713 is located about one width unit from the fold 720; adhesive line 715 is located adjacent the free end of longitudinal margin 726; and adhesive line 717 is located about one width unit from fold 722.

Figure 25C:
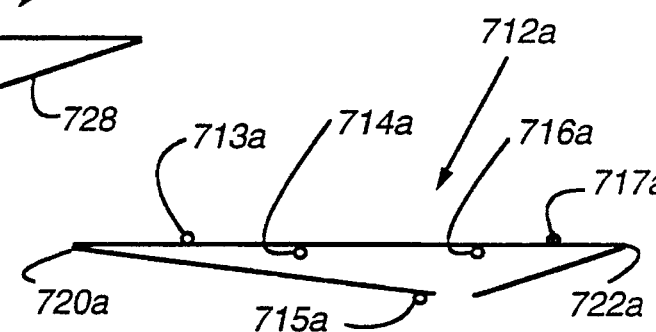
FIG. 25C is a schematic vertical sectional view similar to FIG. 25B but illustrating a second embodiment of the manner in which the material is to be folded and glued.
Figure 25B:
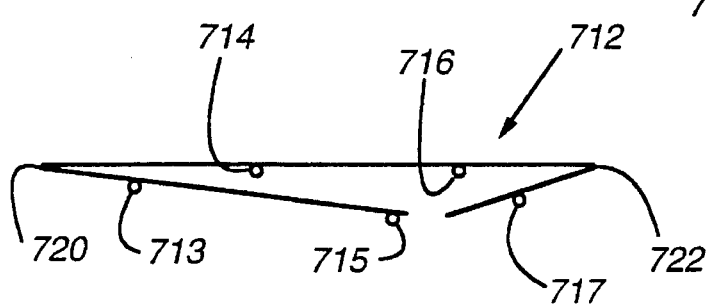
FIG. 25B is a schematic vertical sectional view illustrating a first embodiment of the manner in which the material is to be folded and glued in the construction of the panel illustrated in FIG. 24.

An alternative placement of the five adhesive lines on the folded material 712a to produce four cell row panel 710 is shown in FIG. 25C. In this embodiment, adhesive line 713a is located on the central portion 724a, on the opposite surface from adhesive lines 714a and 716a, about one width unit from the fold 720a. Adhesive line 717a is also located on the central portion 724a, on the same surface of material 712a as adhesive line 713a, about one width unit from fold 722a.

Figure 26:
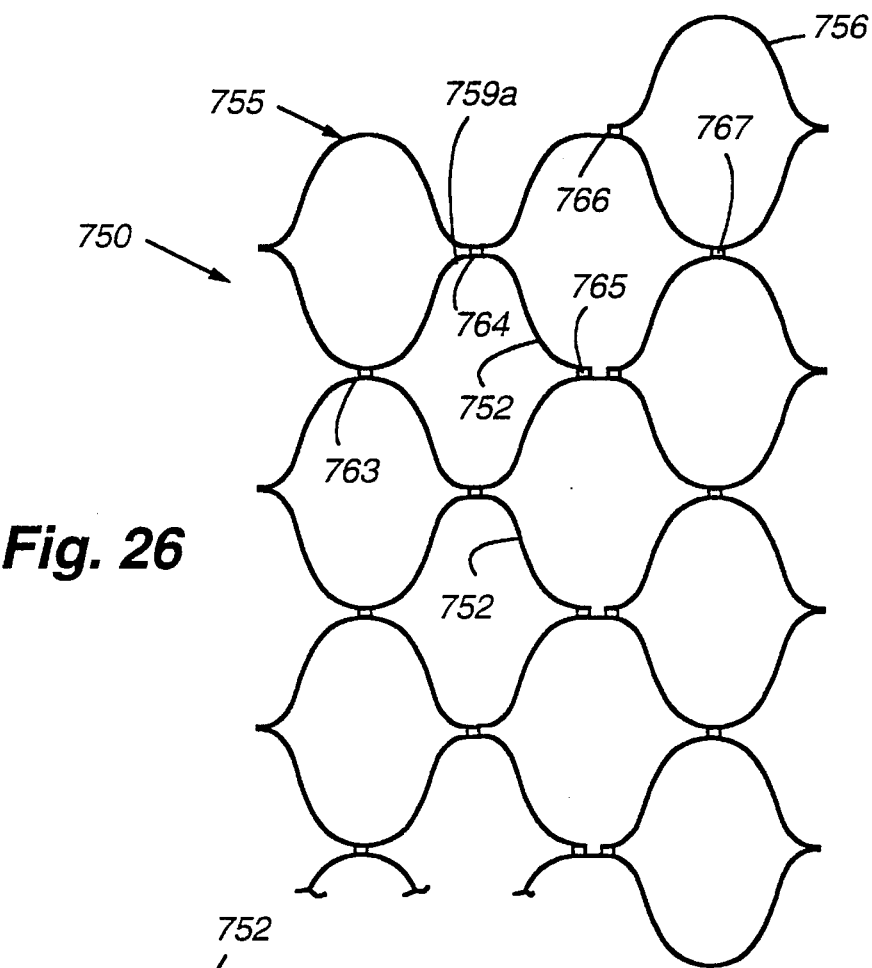
FIG. 26 is a fragmentary, schematic vertical sectional view showing a second embodiment of a four cell row panel constructed in accordance with the present invention.
Figure 27A:
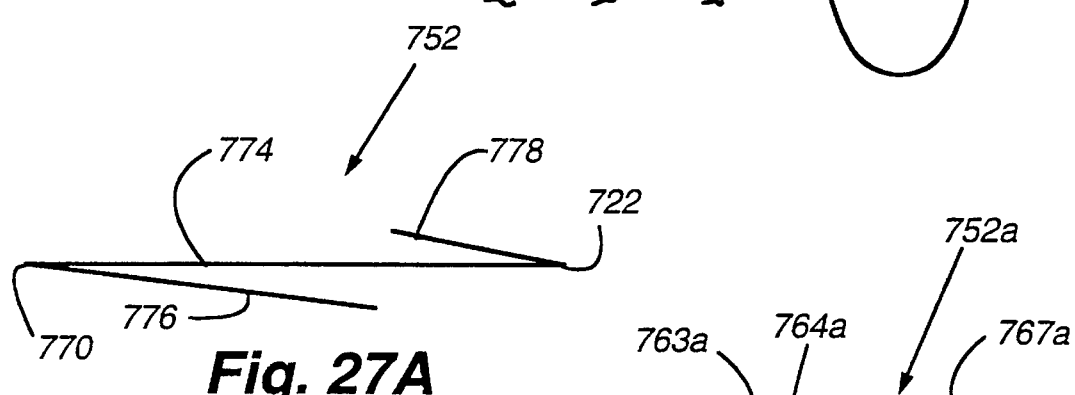
FIG. 27A is a vertical sectional view showing the manner of folding a length of material to produce the four cell row panel of FIG. 26.

A second embodiment of a four cell row panel 750 according to the present invention is shown in FIG. 26. The four cell row panel 750 is similar to four cell row panel 710 in the arrangement of the cells relative to one another, the number of width units of the folded material, and the number of glue lines. However, four cell row panel 750 is produced from Z-folded material 752, as shown in FIG. 27A. The folded material 752, like the folded material used to produce the four cell row panel of FIG. 24, comprises ten width units including a central portion 774 of approximately five width units. The folded material 752 further comprises a downwardly and inwardly folded longitudinal margin 776 of approximately three width units and an upwardly and inwardly folded longitudinal margin 778 of approximately two width units.

After the material 752 has been Z-folded as shown in FIG. 27a, five adhesive or glue lines or zones are applied longitudinally on the folded material 752. Adhesive line 766 is applied on one surface of the material 752, approximately two width units from fold 772, to secure the free edge of longitudinal margin 778 to the center portion 774. Adhesive line 764 is applied to the opposite surface of the material 752 from adhesive line 766, approximately two width units from fold 770 and one width unit from adhesive line 766. A portion of longitudinal margin 776 about two width units from the fold 770 is secured to the central portion 774 by the adhesive line 764. Adhesive lines 763 and 767 are applied to the same surface of the material 762 as adhesive line 766. Adhesive line 763 is located on longitudinal margin 776, about one width unit from the fold 770. Adhesive line 767 is located adjacent the free end of longitudinal margin 776. Adhesive line 767 is located about one width unit from fold 772, on the central portion 774 and on the same surface as adhesive line 764.

Figure 27C:
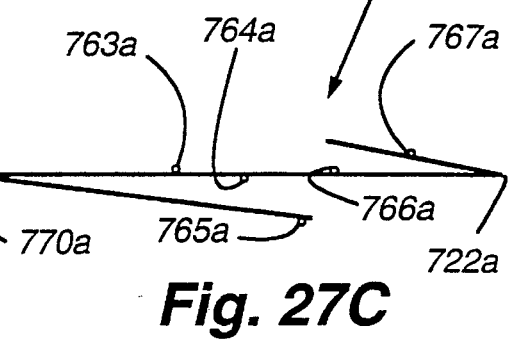
FIG. 27C is a schematic vertical sectional view similar to FIG. 27B but illustrating a second embodiment of the manner in which the material is to be folded and glued.
Figure 27B:
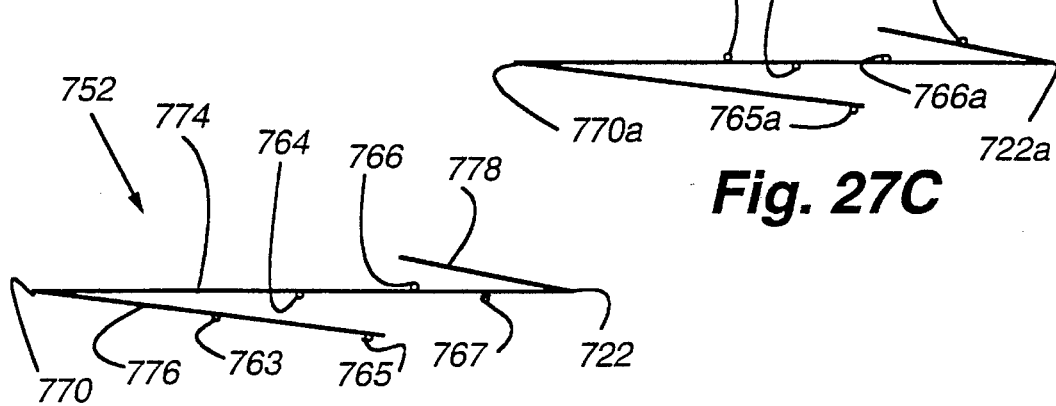
FIG. 27B is a schematic vertical sectional view illustrating a first embodiment of the manner in which the material is to be folded and glued in the construction of the panel illustrated in FIG. 26.

An alternative placement of the five adhesive lines on the folded material 762a to produce four cell row panel 750 is shown in FIG. 27C. In this embodiment, adhesive line 763a is located on the central portion 774a, on the opposite surface from adhesive line 764a, about one width unit from the fold 770a. Adhesive line 767a is located on the longitudinal margin 778, on the same surface of material 762a as adhesive line 764a, about one width unit from fold 772a.

Referring now to FIG. 28, there is shown a five cell row panel 810 constructed according to the present invention. Like the multiple cell row panels described above, the five cell row panel 810 is constructed from a plurality of folded and glued material strips, designated by the reference number 812. However, to produce the five cell row panel 812, the material is folded and glued at different locations than the material is used to produce the double, triple and four cell row panels.

The five cell row panel 810, as shown in FIG. 28, comprises five rows of longitudinally extending cells, a front row 805, a back row 806 and three middle rows 809a, 809b, 809c. The cells of the front row 805 extend longitudinally, substantially parallel to the cells of the middle row 809*b* and the back row 806. The cells of the middle rows 809*a* and 809*c* are formed by gluing together a cell "triplet" including parallel front row 805, middle row 809*b* and back row 806 cells to another cell triplet along glue or adhesive lines 831, 816 and 818. The five cell row panel 810 is produced from a C-folded material strip 812.

The C-folded condition of the material strip 812 is shown in FIG. 29A. As there seen, the material strip 812 is initially of a width equal to twelve width units. The center portion 824 of the folded material 812 comprises approximately six width units, the upwardly and inwardly folded longitudinal margin 826 comprises approximately two width units, and the upwardly and inwardly folded longitudinal margin 828 comprises approximately four width units.

After the material 812 has been folded as shown in FIG. 29A, seven adhesive or glue lines or zones are applied longitudinally on the folded material 812. As shown in FIG. 29B, adhesive line 814 is applied on one surface of the material 812, approximately two width units from fold 820, to secure the free edge of longitudinal margin 826 to the center portion 824. Adhesive line 815 is applied to the same surface of the material 812 as adhesive line 814, approximately four width units from fold 820 and adjacent adhesive line 814. A portion of longitudinal margin 828 about two width units from the fold 822 is secured to the central portion 824 by the adhesive line 817. Adhesive lines 813, 816 and 818 are applied to the opposite surface of the material 812. Adhesive line 813 is located about one width unit from the fold 820; adhesive line 816 is located at approximately the midpoint of central portion 824; and adhesive line 818 is located about one width unit from fold 822.

An alternative placement of the seven adhesive lines on the folded material 812*a* to produce five cell row panel 810 is shown in FIG. 29C. In this embodiment, adhesive line 813*a* is located on the longitudinal margin 826*a* on the opposite surface from adhesive lines 814*a* and 815*a*, about one width unit from the fold 820*a*. Adhesive lines 816*a* and 818*a* are located on the longitudinal margin 828*a*, three and one width units, respectively, from the fold 822, on the same surface of material 812*a* as adhesive line 813*a*.

Another alternative placement of the seven adhesive lines on the folded material 812*b* is shown in FIG. 29D. In this embodiment, adhesive lines 814*b* and 815*b* are located adjacent the free ends of longitudinal margins 826*b* and 828*b*, respectively.

A second embodiment of a five cell row panel 850 according to the present invention is shown in FIG. 30. The five cell row panel 850 is similar to five cell row panel 810 in the arrangement of the cells relative to one another, the number of width units of the folded material, and the number of glue lines. However, five cell row panel 850 is produced from Z-folded material 852, as shown in FIG. 31A. The folded material 852, like the folded material used to produce the five cell row panel of FIG. 28, comprises twelve width units including a central portion 874 of approximately six width units. The folded material 852 further comprises a downwardly and inwardly folded longitudinal margin 876 of approximately two width units and an upwardly and inwardly folded longitudinal margin 878 of approximately four width units.

After the material 852 has been folded as shown in FIG. 31A, seven adhesive or glue lines or zones are applied longitudinally on the folded material 852. As seen in FIG. 31B, adhesive line 854 is applied on one surface of the central portion 874 of the material 852, approximately two width units from fold 870, to secure the free edge of longitudinal margin 876 to the center portion 874. Adhesive line 855 is applied to the opposite surface of the material 852 from adhesive line 854, approximately four width units from fold 872 and adjacent adhesive line 854, to secure the free end of longitudinal margin 878. A portion of longitudinal margin 878 about two width units from the fold 872 is secured to the central portion 874 by the adhesive line 857. Adhesive lines 856 and 858 are applied to the same surface of the material 852 as adhesive line 854. Adhesive line 856 is located on central portion 874, about three width units from the fold 872. Adhesive line 858 is located about one width unit from fold 872. Adhesive line 852 is located on longitudinal margin 876, on the same surface of the material 852 as adhesive lines 855 and 857, about one width unit from fold 870.

An alternative placement of the seven adhesive lines on the folded material 852*a* is shown in FIG. 31C. In this embodiment, adhesive line 853*a* is located on the central portion 874*a*, about one width unit from fold 870*a*. Adhesive lines 856*a* and 858*a* are located on longitudinal margin 878*a*, approximately three and one width units from fold 872*a*, respectively.

Another alternative embodiment of the seven adhesive lines on the folded material 852*b* is shown in FIG. 31D. As there seen, adhesive line 854*b* is located on the longitudinal margin 876*b*, adjacent the free end. Adhesive line 855*b* is located on the other longitudinal margin 878*b*, adjacent the free end thereof.

In addition to the double, triple, four and five cell row panels described in detail above, multiple cell row panels having six or more cell rows are also contemplated within the scope of the present invention. Multiple cell row panels having an even number of cell rows, e.g., six, eight, etc., can be constructed by folding a strip material in either a Z-fold configuration or a C-fold configuration and applying an appropriate number of adhesive or glue lines, similar to the manner of folding and gluing to produce the four cell row panels described above. Multiple cell row panels having an odd number of cell rows, e.g., seven, nine, etc., can be constructed by folding a strip material in either a Z-fold configuration or a C-fold configuration and applying an appropriate number of adhesive or glue lines, similar to the manner of folding and gluing to produce the five cell row panels described above.

As is apparent from the foregoing description of illustrative multiple cell row panels of the present invention, to produce a multiple cell row panel having N number of cell rows (N being greater than 1), a strip material is Z-folded or C-folded to provide a folded material of 2N+2 width units; and then N+2 adhesive or glue lines are applied to the folded material. In multiple cell row panels having an even number of cell rows, one of the adhesive or glue lines is located so as to secure a free end of one longitudinal margin to the central portion of the folded material. In a multiple cell row panel having an odd number of cell rows, one adhesive or glue line is located on the folded material so as to secure the free end of one longitudinal margin to the central portion and another adhesive or glue line is located on the folded material so as to secure the free end of the other longitudinal margin to the central portion of the folded material. Finally, although the "offset" embodiment has been described and illustrated by reference to a triple cell row panel of the present invention, offset multiple cell row panels of two, four, five and more cell rows are also contemplated within the scope of the present invention.

Figure 10:
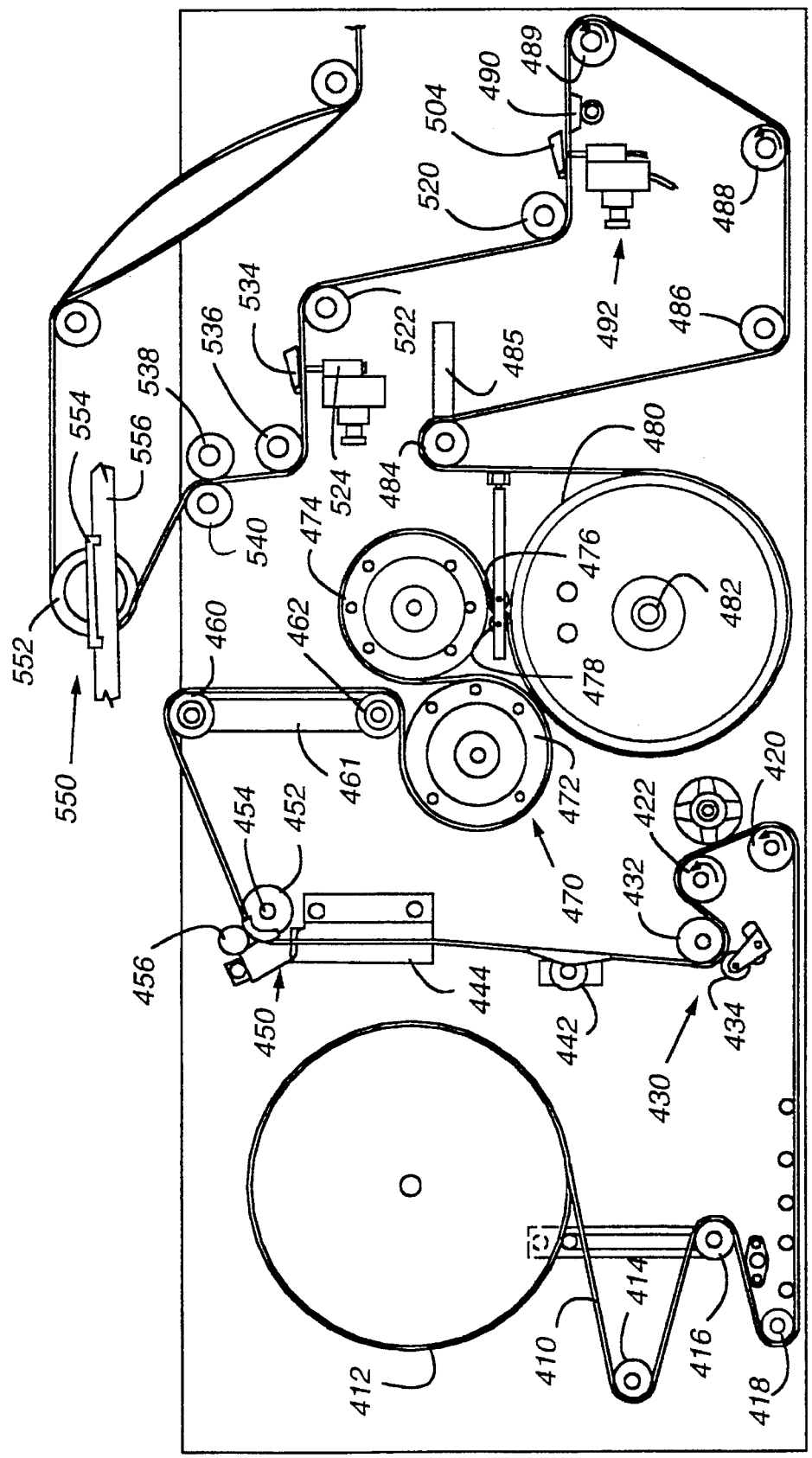
FIG. 10 is a side plan view of a folding and gluing portion of an apparatus for producing a multiple cell row panel of the invention.
Figure 11:
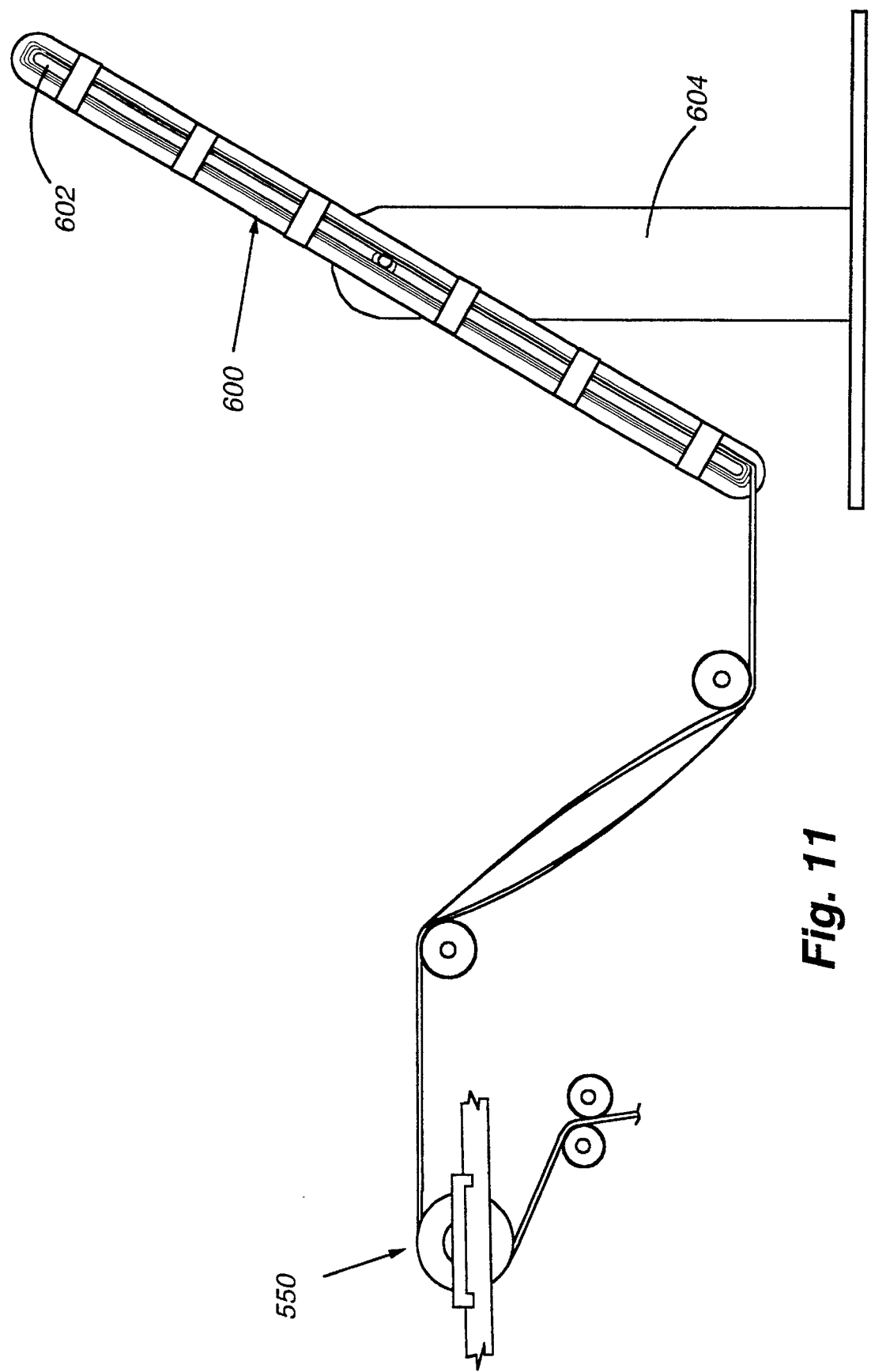
FIG. 11 is a side plan view of the winding and stacking portion of an apparatus for producing a multiple cell row panel of the invention.

To fabricate the multiple cell row panels shown in FIGS. 1, 3, 5, 7, 22, 24, 26, 28 and 30, a method based on the method disclosed in U.S. Pat. Nos. 4,631,108 and 4,631,217 is used. FIGS. 10 and 11, taken together show a plan view of apparatus similar to that of U.S. Pat. Nos. 4,631,108 and 4,631,217, as modified in accordance with the present invention. The particular apparatus illustrated in FIGS. 10 and 11 is adapted to produce the triple cell row panel 110 of FIG. 5 from a material folded and glued as shown in FIG. 6C. Modifications to this apparatus to produce the other embodiments of the invention described above will be discussed hereinafter.

As shown in FIG. 10, a continuous strip of foldable, creasable and drapable material 410 is provided from a supply roll 412. The material for producing the multiple cell row panels of the present invention may be a thin film of polyester, or possibly a non-plastic material, such as a non-woven or woven fabric, or a laminated material having suitable characteristics, including the ability to be readily folded and creased and to drape in an aesthetically pleasing manner from a fold or crease zone thereof. The fabric should also have the ability to have various sections thereof glued or otherwise bonded together and, preferably, also have the ability to be supported along a top margin of a vertical multiple cell row panel constructed of such material. An especially suitable and preferred material is a polyester, spun-bonded non-woven fabric.

The fabric may also be selected based on the particular purpose for which the panel is to be used. For example, to provide a blackout multiple cell honeycomb panel, the fabric can be a two layer or two ply laminate having a non-woven polyester material 180 on one side and a thin polyester film material 182, such as Mylar, on the other side as shown in FIG. 9A. Use of a two layer laminate as shown in FIG. 9A has the additional advantage of increasing the insulating effect of the multiple cell row panel approximately 40% to 50% over that achieved by a multiple cell row panel produced from a single layer material. The material can also be a three layer laminate having a layer of polyester film 190, e.g., Mylar, sandwiched between two layers 192, 194 of non-woven polyester material as shown in FIG. 9B. Two- and three-ply laminates of this type are generally known in the art and have been used in other types of window coverings.

In order to achieve the desirable appearance of the multiple cell row panel with a plurality of longitudinally extending cells, each of which drapes gracefully and has an outwardly pointed, permanent fold, the material must have a certain amount of softness. Generally, the material for a multiple cell row panel for the present invention should be softer than the material for a single cell honeycomb panel; however, materials previously used to fabricate single cell honeycomb panels may also be used in the multiple cell row panels of the present invention.

From the supply roll 412, the strip material 410 is directed around a series of guide rollers 414, 416 and 418 and over a pair of alignment rollers 420, 422, which are effective to keep the strip material 410 in proper alignment for initial creasing of the strip material. The alignment rollers 420, 422 are mounted on respective shafts and are driven in the directions indicated by the arrows in FIG. 10. The alignment rollers have radially extending raised edges and the distance between the radially extending edges on the alignment rollers is slightly greater than the width of the strip material 410.

From aligning roller 422, the strip material 410 passes around a rubber surfaced backing roller 432 of the creaser assembly 430. As the strip material 410 moves around the backing roller 432, a pair of creaser wheels 434, having sharp peripheral edges, press a pair of longitudinally extending permanent creases in spaced apart relation to each other on the same side of the strip material 410. The creases define lines of demarcation between the opposite longitudinal margins of the strip material 410 and the central portion thereof. Suitable creaser wheels for folding the strip material 410 in the manner shown in FIG. 6A are shown, for example, in FIG. 2 of U.S. Pat. No. 4,631,108.

After leaving the creaser assembly 430, the strip material 410 is fed through a folding assembly 440. The folding assembly folds the strip material longitudinally along the crease lines to form folds 120, 122 shown in FIG. 6A, for example. The folding is such as to fold each longitudinally margin over the central portion on the same side of the strip material 410. The folding assembly 440 includes a folding roller 442 which causes the longitudinal margin to fold upwardly to nearly a right angle relative to the central portion of the strip material. The folding roller 442 curves the strip material 410 with the edges folded upwardly so that the distance travelled by the central portion of the strip material 410 equals the distance travelled by the folded up longitudinal margins. After the strip material 410 passes the folding roller 442, it enters a folding box 444, which includes a passage having a height less than the width of the longitudinal margins of the strip material. This passage on the folding box 444 causes the longitudinal portions to fold over on top of the central portion of the strip material 410 to form the open tube or cell structure shown in FIG. 6A. The folding box 444 may be of any construction suitable for folding the material along the longitudinal creases, such as a folding channel or a series of rotatable rollers spaced at an appropriate distance from a planar wall of the folding box.

As the folded strip material 410 leaves the folding box 444, it passes through a crimper assembly 450. The crimper assembly 450 includes a large roller 452 rotatable about shaft 454. The folded strip material 410 passes around the peripheral surface of the roller 452. A spring biased crimp roller 456 is positioned adjacent the peripheral surface of the roller 452 such that as the folded strip material 410 passes between the crimp roller 456 and the peripheral surface of roller 452, the folded strip material is tightly pressed and squeezed to form folds in the strip material 410 along the longitudinally extending creases formed by the creaser assembly 430. From the crimper assembly 450, the folded strip material 410 passes over guide rollers 460, 462 and into heat roller assembly 470. Heat roller assembly 470 comprises a pair of heated rollers 472, 474 which are effective to heat the folded strip material to a temperature sufficient to achieve sharp, permanent folds along the longitudinally extending crease lines. Assembly 470 permanently sets the folds and provides the unique and aesthetically pleasing outwardly pointed folds 350, 352 of the panel 110 shown in FIG. 5. The folded strip material 410 is passed around the peripheral surface of the first heated roller 472 and then around the peripheral surface of the second heated roller 474. Each of these heated roller 472, 474 is heated to a temperature of about 250° to 390° F. As the strip material 410 is heated against the peripheral surfaces of the rollers 472, 474 under the slight tension in the operating system, the molecular structure of the strip material 410 rearranges to permanently set the longitudinal creases.

While the strip material 410 is still hot, this strip material 410 passes between the nip or press rollers 476, 478 which apply a rolling pressure across the entire width of the strip material 410 to permanently set the longitudinal creases.

After the folded strip material 410 passes between the rollers 476, 478, it travels around the peripheral surface of the drive roller 480. The drive roller 480 is cooled to below 180° F. so that it is effective to function as a cooling roller to lower the temperature of the strip material 410 so that the longitudinal creases are set permanently. The drive roller 480 not only effectively cools the strip material 410, but is also used to pull the strip material 410 through the apparatus. The drive roller 480 is journaled on a shaft 482 so that a motor and drive belt (not shown) are effective to rotate the drive roller 480. The press roller 478, in addition to cooperating with roller 476 to permanently set the creases in the strip material 410, also applies the pressure to press the strip material 410 against the cylindrical peripheral surface of the drive roller 480 to provide the traction necessary for pulling film 410 through the apparatus.

Passing the creased and folded material 410 sequentially through the crimper assembly 450, the heat roller assembly 470 and over the cooled drive roller 480 permanently sets the longitudinal folds. This provides the unique and aesthetically pleasing outwardly pointed folds 350, 352 of the triple cell row panel 110 of the present invention, as shown in FIG. 5.

In the heat roller assembly 470, the material 410 is heated to a very high temperature, between about 250° and 390° F., depending on the material used. These temperatures melt the crystalline structure of a polyester material and cause it to become suitably deformable or stretchable. This allows a permanent crease to be put in the material 410, but it also could permit the material 410 to stretch excessively. In many cases, when brought to these temperatures, polyester material will shrink slightly in the machine direction. If the material is kept at a low enough tension, this shrinkage is desirable as further shrinkage will not occur when a shade is put in a window and exposed to the high temperature of the sun. Therefore, it is desirable to keep the tension through the heat roller assembly 470 both on the heating side, i.e., before heat roller 472, and on the cooling side, i.e., after cooled drive roller 480, as low as is practicable.

To achieve the minimum tension level at which the machine will operate, dancer assemblies which exert a biasing force against the material are provided before and after the heat roller assembly 470 to tension the material 410. The dancer assembly before the heat roller assembly 470 includes guide roller 460 which is mounted on one end of vertical arm 461. Vertical arm 461 is pivotally mounted such that the guide roller 460 can swing from about 45° to 60° in order to adjust slack between the crimper assembly 450 and the heat roller assembly 470. The dancer assembly after the heat roller assembly 470 includes guide roller 484 which is mounted on one end of horizontal arm 485. Arm 485 is also pivotally mounted, to permit guide roller 484 to swing and thereby adjust slack in the material 410 between heat roller assembly 470 and the glue applicators.

There are separate motors (not shown) controlling the folding section of the machine, the heat roller section of the machine, and the adhesive application section of the machine. As discussed, the dancers apply tension on the material 410 before and after the heat roller assembly. The motor speeds are then proportioned by the dancers automatically so that the dancers will remain roughly at the mid-point. In practice, the heat roller drive follows the speed of the adhesive applicator drive and is slightly proportioned faster or slower as the dancer 484, 485 between the two of these motors changes position. For example, if the dancer 484, 485 moves up, giving a longer loop of fabric, the heat roller drive is slightly slowed by this movement. On the other hand, if the dancer 484, 485 moves downward, the heat roller 484, 485 drive is slightly sped-up to compensate and keep the dancer at mid-point. The dancer 460, 461 between the folder drive and the heat roller drive works similarly with the folder drive speed following the heat roller drive speed proportioned slightly by the position of the dancer 460, 461 between the two of them.

From the drive roller 480, the folded strip material 410 passes over guide roller 484 and under guide roller 486. Then the folded strip material 410 passes around the aligning rollers 488, 489 so that the folded strip material 410 is properly aligned for the adhesive applicator assembly. Like aligning rollers 420 and 422, aligning rollers 488 and 489 have raised, radially outwardly extending edges to maintain the folded strip material 410 in proper alignment.

Figure 12A:
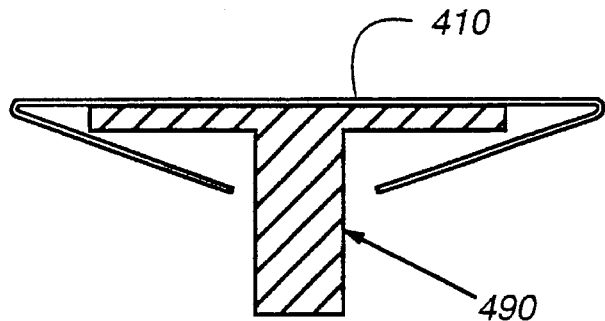
FIG. 12A is a cross-sectional view of the strip opener of the apparatus of FIG. 10.
Figure 12B:
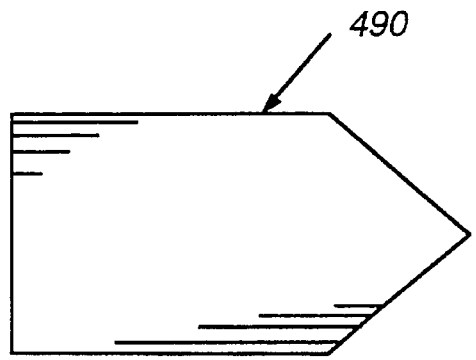
FIG. 12B is a top view of the strip opener.

After the folded strip material 410 passes around the aligning roller 489, the strip material 410 passes over strip opener 490 to open the folded strip material 410 sufficiently to deposit glue on the inner surface thereof. FIG. 12A shows a top view of the strip opener 490 and FIG. 12B shows a cross-sectional view of the strip opener 490 with the opened strip material 410 extending thereover. As the strip material 410 passes over the strip opener 490, the folded longitudinal margins of the strip material 410 are displaced downwardly and outwardly to provide access to the central portion of the strip material 410.

Figure 13:
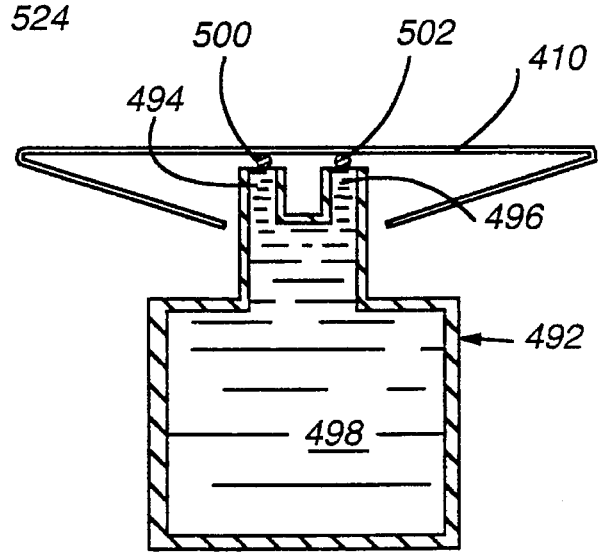
FIG. 13 is a cross-sectional view of the first glue applicator of the apparatus of FIG. 10.

After the strip opener 490 opens the strip material 410, two center lines of adhesive are applied to the inner surface of the central portion of the strip material 410 by the glue applicator 492. As shown in FIG. 13, the glue applicator 492 has two spaced apart nozzles 494, 496 through which glue 498 is applied in parallel glue lines 500, 502 on the inner surface of the folded strip material 410. As the strip material 410 passes over the glue nozzles 494, 496, the glue applicator 492 discharges two uniform glue lines 500, 502 on the central portion of the strip material 410. As described in U.S. Pat. No. 4,631,108, the glue applicator assembly includes a positive displacement gear pump (not shown) which is effective to apply glue in direct proportion to the rotational speed of the pump, which pump rotates at a speed directly proportional to the speed of rotation of the drive roller 480. Thus, the amount of glue applied to the strip material 410 by the glue applicator is proportional to the linear speed of the strip material 410 passing through the apparatus.

A glue press assembly 504 ensures that the material 410 is consistently and properly located with respect to the glue nozzles 494, 496 to ensure uniformity of the glue lines 500, 502. The glue press includes a roller biased against the upper surface of the strip material 410 beyond the glue applicator 492 and a bottom aligner shaft is provided to support the strip material 410 before the glue press 492.

The glue press permits adjustment of the spacing between the glue nozzles and the material 410 passing thereover. Preferably, this spacing is adjusted to provide a flattened glue line, rather than a rounded bead. The flattened profile of the glue lines provides greater control of the amount of glue applied and prevents the glue from undesirably spreading out when the fabric with the glue thereon is pressed against another piece of fabric to bond two fabrics together.

The choice of glue or adhesive depends upon the type of material 410. Preferably, the glue is a hot melt adhesive which has no strength at room temperature and must be exposed to high humidity to harden.

An especially preferred adhesive for use with the preferred non-woven, spun bonded polyester material is a 100% solids, urethane, cross-linking hot melt adhesive. If a two layer laminate having a layer of polyester film which must be secured to itself by a glue line is used as the material 410, a suitable adhesive would be a silicone based 100% solids adhesive. Of course, other adhesives such as a hot melt adhesive which cures rapidly at room temperature could also be used, within the scope of the present invention.

Figure 14:
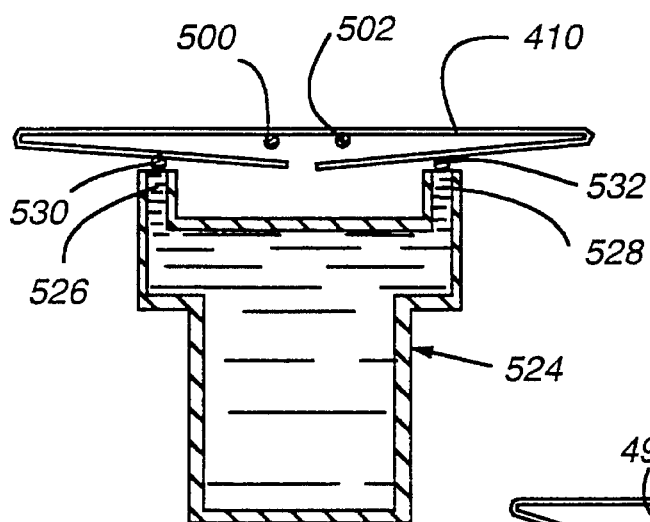
FIG. 14 is a cross-sectional view of the second glue applicator of the apparatus of FIG. 10.

After the glue applicator 492, the strip material 490 is permitted to return to its closed, folded position such that the edges of the longitudinal margins of the folded strip material 410 contact the respective glue lines 500, 502. The closed, folded strip material 410 passes around aligning rollers 520, 522 and then through second glue assembly 524. As shown in FIG. 14, second glue assembly 524 is similar in construction to glue assembly 492, except that the glue nozzles 526, 528 are spaced further apart than glue nozzles 494, 496 of the first glue assembly 492. Like the first glue applicator 492, glue applicator 524 discharges two uniform beads of glue onto the folded strip material 410 and the amount of glue discharged by the glue applicator 524 is proportional to the linear speed of the strip material 410 passing through the apparatus. The amount of glue applied by glue applicator 524 as glue lines 530, 532 is greater than the amount of glue applied by the glue applicator 492 as glue lines 500, 502 because the glue lines 530, 532 require greater bonding strength than the glue lines 500, 502 since the forces applied to glue lines 530, 532 are greater in the final multiple cell row panel than are the forces applied to glue lines 500, 502.

The amount of glue applied by the glue applicator 524 is proportional to the linear speed of the strip material 410 passing through the apparatus and is also proportional to the amount of glue applied by the first glue applicator 492. The relative amounts of glue applied by the glue applicator 524 as glue lines 530, 532 and by the glue applicator 492 as glue lines 500, 502 is determined by a gearing mechanism (not shown).

A second glue press 534 is provided adjacent second glue applicator 524 and the structure of glue press 534 is identical to that of the glue press associated with the first glue applicator 492.

After the second glue applicator 524 applies the glue lines 530, 532, the folded strip material passes around aligning roller 536 and then is pressed between press roller 538 and split roller 540. Split roller 540 has a recessed portion therein to allow the glue lines 530, 532 to pass thereover undisturbed.

After the strip material 410 passes between the press roller 538 and split roller 540, it proceeds to the tension and speed control assembly 550. The tension and speed control assembly 550 comprises a dancer roller 552 rotatably mounted on a slidable carrier 554, which slidable carrier 554 is in turn slidably mounted on rail 556. The tension and speed control assembly 550 is necessary to maintain a constant tension on the strip material 410 as it passes through the apparatus and is wound around the stacking arm shown in FIG. 11.

The stacking arm shown in FIG. 11 has the same structure shown in U.S. Pat. No. 4,631,108. As described in U.S. Pat. No. 4,631,108, as the stacking arm rotates in the angular direction, it takes up and winds the strip material 410 around itself in successive lengths approximately equal to the length of the stacking bed. As shown in FIG. 11, as the stacking arm rotates in the direction indicated by the arrow, two stacks of the strip material 410 are deposited in layers on opposite flat surfaces of the stacking bed. As an end of the stacking arm approaches the aligning roller, the velocity of the strip material 410 drawn around the rollers decreases significantly. The tension and speed control assembly 550 compensates for this difference in speed between the strip material 410 being pulled through the apparatus by the drive roller 480 and the strip material 410 being pulled by the stacking arm. The slack in the strip material 410 created by this difference in speed is taken up by the tension and speed control assembly 550 by movement of the dancer roller 552 and its carrier 554 along rail 556.

After a desired number of layers of material 410 have been wound around stacking arm 600, the stacking bed 602 is removed from its support 604 and placed in a curing chamber to cure the adhesive and complete production of the triple cell row panel. The curing chamber is maintained at a temperature and humidity appropriate for the particular adhesive used and, similarly, the curing time is adapted for the particular adhesive. For example, when the adhesive is the preferred 100% solids, urethane, crosslinking hot melt adhesive, the curing chamber is maintained at 100° F. and 95% humidity and the adhesive is allowed to cure for about 4 hours. After the curing is complete, the rounded end sections of the stacked layers are cut away from the stack, and two panels having the structure shown in FIG. 5 is produced. If the adhesive does not require curing, the rounded end sections can be cut off the stack immediately after winding to produce the triple cell row panels.

In order to produce other embodiments of the multiple cell row panels described herein, modifications to the method and/or apparatus detailed above are necessary. Thus, to produce a triple cell row panel from a folded material having the glue lines applied as in FIG. 6B, the first and second glue applicator assemblies would be disposed on opposite sides of the strip material 410 as it passes through the apparatus. To produce the triple cell row panel from a folded material having the glue lines applied as in FIG. 6D, the second glue applicator assembly is replaced by two glue applicator assemblies having a single nozzle, the two single nozzle glue applicator assemblies being disposed on opposite sides of the strip material 410. The offset triple cell row panel shown in FIG. 7 can be produced by the same methods, using the same apparatus and modifications discussed above, as the triple cell row panel of FIG. 5. The only difference would be in the spacing of the glue lines applied to the outer surface of the folded material. To produce the triple cell row panel shown in FIG. 22, the creaser assembly is replaced by a creaser assembly having two separate creaser wheels disposed on opposite sides of the material 410, as described in U.S. Pat. No. 4,631,217, to produce the folded configuration of FIG. 23A.

To produce the double cell row panel shown in FIG. 1, the creaser assembly of U.S. Pat. No. 4,631,217 is used to produce the folded configuration shown in FIG. 2A. The first glue applicator is replaced by a single nozzle glue applicator to apply the single center line of glue, and then, depending upon the location of the additional two glue lines, appropriately located single nozzle glue applicators, or a double nozzle glue applicator are provided. Finally, to produce the double cell row panel of FIG. 3, the creaser assembly described above with reference to FIGS. 5 and 6A, and illustrated in U.S. Pat. No. 4,631,108, is modified, to change the spacing of the creaser wheels as necessary to produce the unsymmetrical folded material shown in FIG. 4A. Appropriate single and double nozzle glue applicators are provided to produce the structures shown in FIGS. 4B and 4C.

The four and five cell row panels of FIGS. 24 and 26 and FIGS. 28 and 30, respectively, are similarly produced, using apparatus having appropriately positioned single and double nozzle glue applicators to produce the desired glue line placement as shown in FIGS. 25B–C, 27B–C, 29B–D and 31B–D. The creaser assembly of U.S. Pat. No. 4,631,108, with the creaser wheel spacing modified as necessary, is used to produce the C-folded structures of FIGS. 25A and 29A. The creaser assembly of U.S. Pat. No. 4,631,217, with the creaser wheel spacing modified as necessary, is used to produce the Z-folded structures of FIGS. 27A and 31A.

Figure 15:
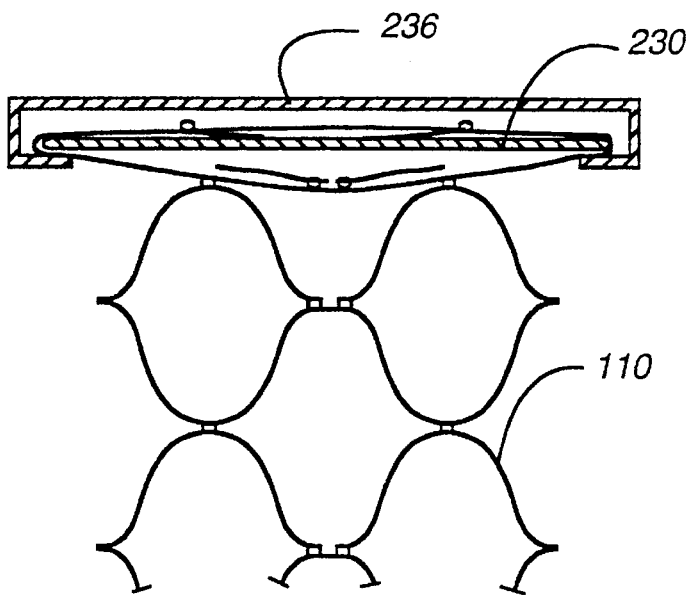
FIG. 15 is a fragmentary schematic vertical sectional view illustrating the manner in which the upper margin of the panel of FIG. 5 may be suspended from a header channel.

The present invention further relates to methods and apparatus for mounting a honeycomb panel, especially a multiple cell honeycomb panel, in a vertical position. Referring now more specifically to FIG. 15, illustrated is the manner in which a standard stiffener strip 230 may be inserted into the upper margin of the panel 110, upon the latter being cut along cut lines or zones 232 and 234, see FIG. 5, and utilized to support the upper margin of the panel 110 from a downwardly opening C-shaped header channel 236 open at at least one end and preferably at both ends. Alternatively, the upper margin of the panel 110 can be cut along line 238 as well as lines 232 and 234, using a three-bladed cutting tool. Then, the portions of the panel 110 adjacent cut line 238 are wrapped around the stiffener strip and secured thereto by transfer tape, prior to mounting in the header channel.

Figure 16:
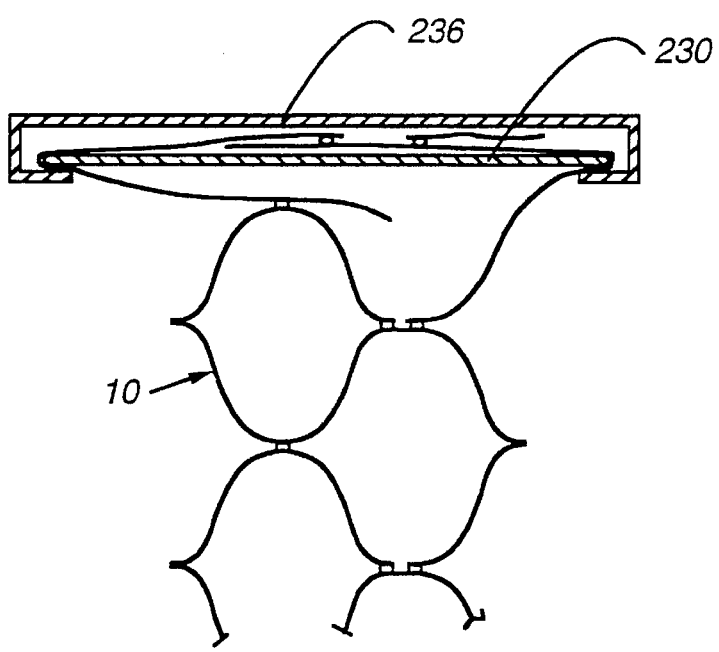
FIG. 16 is a fragmentary schematic sectional view illustrating the manner in which the upper margin of the panel illustrated in FIG. 1 may be supported from a header channel.

With regard to FIG. 16, FIG. 16 illustrates the manner in which the panel 10 illustrated in FIG. 1 may likewise be supported from a horizontal C-shaped header channel 236 using a stiffener strip 230 by cutting the upper margin of the panel 10 along cut line or zone 240, see FIG. 1. After the panel 10 is cut along zone 240, an appropriate stiffener strip 230 is inserted into the upper margin of the panel 10 and then the upper margin of the panel 10 and the appropriate stiffener strip 230 are lengthwise inserted into the header channel 236 from one open end thereof, the panel 110 being inserted into the header channel 236 operatively associated therewith in FIG. 15 in a similar manner.

Figure 32A:
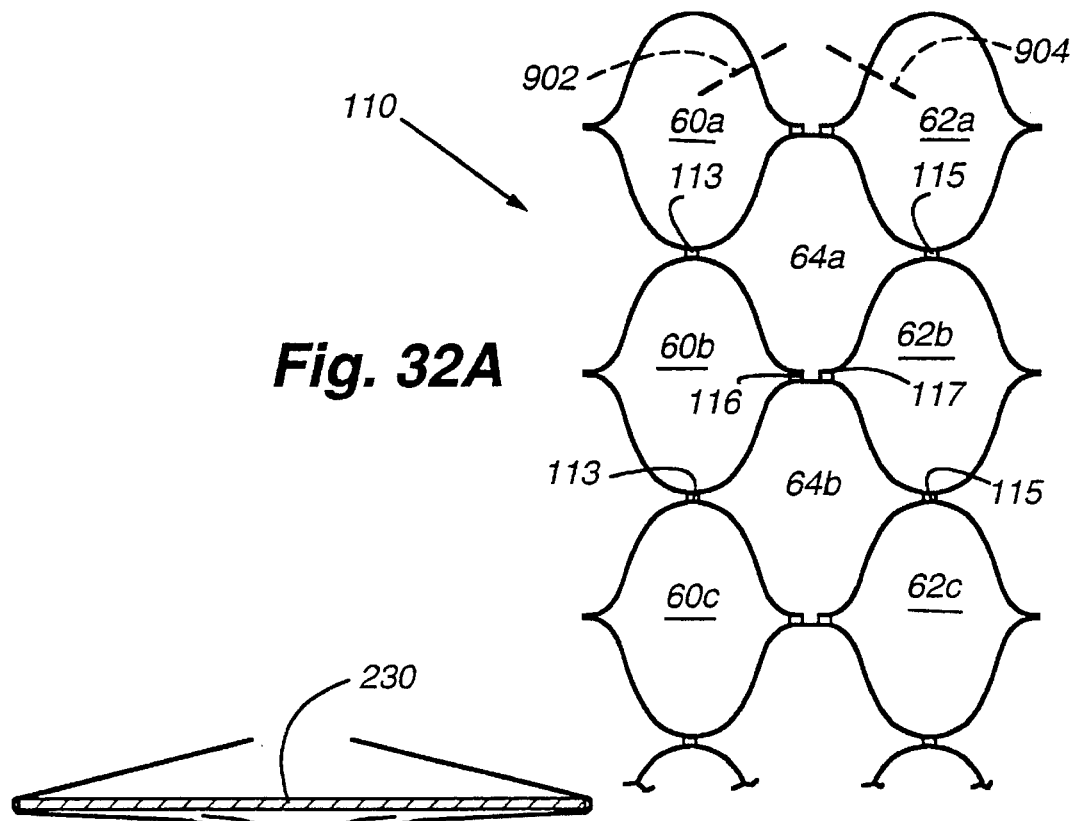
FIGS. 32A, 32B and 32C are fragmentary, schematic vertical sectional views illustrating an alternative manner in which the upper margin of the panel of FIG. 5 may be suspended from a header channel.
Figure 32B:
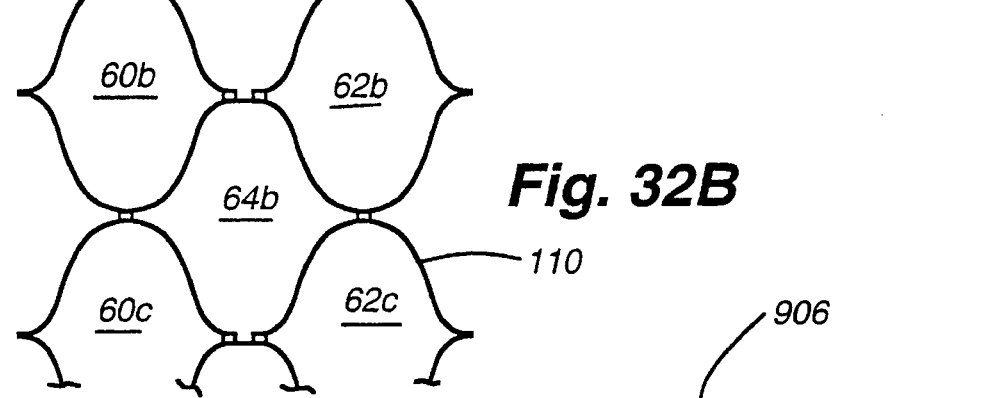
Figure 32C:
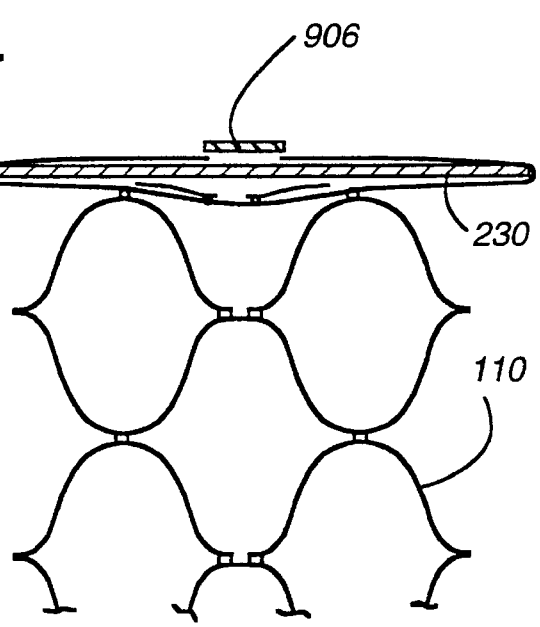

FIGS. 32A–C illustrate an alternative method for inserting a standard stiffener strip 230 into the upper margin of the panel 110. As shown in FIG. 32A, the uppermost cells 60a, 62a are cut along lines 902, 904. Stiffener strip 230 is then inserted between the cut portions as shown in FIG. 32B. The cut edges of cells 60a, 62a, are then closed over stiffener strip 230 and secured with tape 906, as shown in FIG. 32C. The cut edges of cells 60a, 62a could also be secured individually and directly to stiffener strip 230 by transfer tape or the like.

With attention now invited to FIG. 17A and FIG. 17B, FIG. 17A illustrates an upwardly opening header channel or support strip referred to by the reference numeral 250 and including two rows of spaced downward projections 252 with resilient barbed heads supported therefrom. FIG. 17B illustrates a stiffener strip 254 corresponding to the stiffener strips 230 illustrated in FIGS. 15, 16 and 32B and C, but which includes two rows of holes or openings 256 formed therein registerable with the projections 252 when the strip 254 is disposed immediately beneath the header channel or support strip 250.

When the components of FIG. 17A and FIG. 17B are used in combination, they even may be used to support the upper margin 258 of a known honeycomb shade or panel, as disclosed in U.S. Pat. Nos. 4,603,072 and 4,631,108, referred to in general by the reference numeral 260, when the upper cell 262 of the panel 260 is provided with openings corresponding the openings 256, see FIG. 18.

With attention invited now more specifically to FIG. 19, FIG. 19 illustrates the channel or support strip 250 of FIG. 18 having the spaced headed downward projections 252 utilized in conjunction with a pair of stiffening strips 254 each provided with a single row of openings 256, the stiffening panels 254 being insertable in the upper portions of the two outside uppermost cells 270 of the panel 110, or the upper portions of the two outside cells 272 of the double row cell panel 10 illustrated in FIG. 1.

With reference to FIG. 20, an upwardly opening header channel or support strip 280 is illustrated including two rows of longitudinally spaced openings 282 formed therein. A single stiffening strip 284 is provided upwardly from which project headed projections 286 with resilient barbed heads corresponding to the projections 252. The projections 286 are registerable with the openings 282 and receivable through corresponding openings (not shown) in the upper cells of any one of the multiple cell row panels of the present invention or a honeycomb shade or panel such as that illustrated at 260 in FIG. 18.

Figure 21:
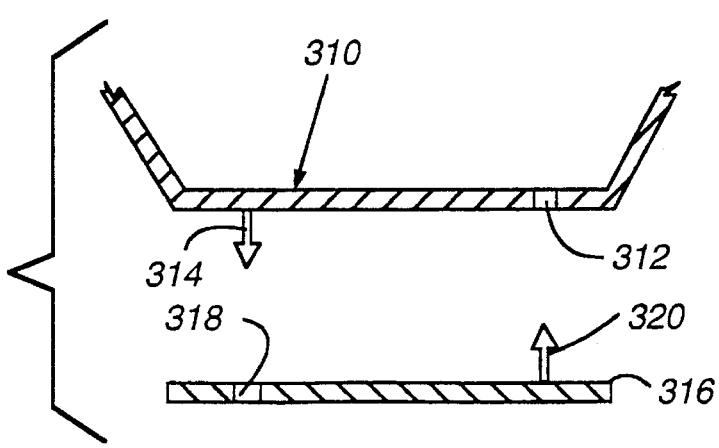
FIG. 21 is a fragmentary, exploded schematic sectional view illustrating a third embodiment of a multiple cell panel support structure similar to that of FIGS. 17A and 17B, but with openings being provided in both the channel and the stiffening strip and headed barbs being provided on both the channel and the stiffening strip.

Finally, referring now to FIG. 21, an upwardly opening header channel or support strip 310 is shown including one row of longitudinally spaced openings 312 and one row of downwardly projecting headed projections 314 with resilient barbed heads. A single stiffening strip 316 is provided having one row of longitudinal spaced openings 318 and one row of upwardly projecting headed projections 320 with resilient barbed heads. As shown, the projections 314 of the header channel are registerable with and receivable through the openings 318 of the stiffening strip 316 and the projections 320 of the stiffening strip 316 are registerable with and receivable through the openings 312 of the header channel 310. The header channel 310 could also be used with two separate stiffening strips, one being provided with longitudinally spaced openings for receiving the projections 314 and the other being provided with upwardly projecting headed projections with resilient barbed heads receivable through the openings 312 of the header channel 310.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as set forth in the appended claims.

What is claimed as new is as follows:

1. A support system for supporting a vertically disposed multi cell panel including at least one row of vertically superposed, horizontal tubular cells, said support system including an elongated support strip and an opposing elongated stiffening strip, one of said strips including headed projections projecting toward the other strip and the other strip including openings formed therethrough registered with said projections and into which said projections may be inserted and retentively retained by the heads thereon, said stiffening member being adapted to be inserted into an upper cell of said multi cell panel after which, by movement of said strips toward each other, said projections may pierce upper wall portions of the cell containing said stiffening strip and be projected into said openings.

\* \* \* \* \*